United States Patent
Duruöz et al.

(10) Patent No.: US 7,333,545 B2
(45) Date of Patent: *Feb. 19, 2008

(54) DIGITAL VIDEO DECODING, BUFFERING AND FRAME-RATE CONVERTING METHOD AND APPARATUS

(75) Inventors: Cem I. Duruöz, San Francisco, CA (US); Taner Ozcelik, San Francisco, CA (US); Yoshinori Shimizu, Shinagawa-ku (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 941 days.

This patent is subject to a terminal disclaimer.

(21) Appl. No.: 10/683,508

(22) Filed: Oct. 10, 2003

(65) Prior Publication Data

US 2004/0076236 A1 Apr. 22, 2004

Related U.S. Application Data

(62) Division of application No. 09/281,013, filed on Mar. 30, 1999, now Pat. No. 6,658,056.

(51) Int. Cl.
*H04N 7/12* (2006.01)
*G06K 9/36* (2006.01)

(52) U.S. Cl. .................. 375/240.25; 382/233

(58) Field of Classification Search ............... 375/240, 375/240.25, 240.2, 240.26; 382/233, 232, 382/236; 345/667, 670; 348/96
See application file for complete search history.

(56) References Cited

U.S. PATENT DOCUMENTS

| | | | |
|---|---|---|---|
| 5,485,280 A | 1/1996 | Fujinami et al. | |
| 5,488,389 A * | 1/1996 | Nakanishi et al. | 345/670 |
| 5,561,465 A | 10/1996 | Fautler et al. | |
| 5,563,660 A | 10/1996 | Tsukagoshi | |
| 5,646,693 A | 7/1997 | Cismas | |
| 5,781,184 A | 7/1998 | Wasserman et al. | |
| 5,818,533 A | 10/1998 | Auld et al. | |
| 5,835,636 A | 11/1998 | Auld | |
| 5,870,087 A | 2/1999 | Chau | |
| 5,999,220 A | 12/1999 | Washino | 348/441 |
| 6,054,977 A * | 4/2000 | Weston et al. | 345/667 |
| 6,118,491 A | 9/2000 | Wu et al. | 348/526 |
| 6,151,075 A | 11/2000 | Shin et al. | 348/459 |
| 6,233,281 B1 | 5/2001 | Uchida et al. | 375/240.24 |

(Continued)

FOREIGN PATENT DOCUMENTS

EP 0 618 722 A1 10/1994

(Continued)

*Primary Examiner*—Gims Philippe
(74) *Attorney, Agent, or Firm*—Wood, Herron & Evans, LLP

(57) ABSTRACT

A decoder decodes full frame MPEG-2 video by a single method that applies regardless of buffer memory and frame rate conversion considerations. A display control module handles frame rate and field sequence in response to host configuration, trick play command signals, and information in the received bitstream. Pictures are decoded as buffer memory for the decoded pictures becomes available, and picture display attributes are assigned and stored in a table, one string for each decoded picture. Frame rate and field sequence are managed in light of memory constraints, to produce a high quality result without re-decoding data.

18 Claims, 9 Drawing Sheets

U.S. PATENT DOCUMENTS 6,658,056 B1 * 12/2003 Duruöz et al. ............. 375/240

FOREIGN PATENT DOCUMENTS

| | | |
|---|---|---|
| EP | 0 729 276 A2 | 8/1996 |
| EP | 0 793 391 A1 | 9/1997 |
| GB | 2 316 824 A | 3/1988 |
| WO | WO 96/14710 | 5/1996 |

* cited by examiner

DIGITAL VIDEO DECODING, BUFFERING AND FRAME-RATE CONVERTING METHOD AND APPARATUS

This application is a divisional of Ser. No. 09/281,013, filed Mar. 30, 1999 now U.S. Pat. No. 6,658,056, which is related to the following commonly assigned U.S. patent applications, each of which is hereby expressly incorporated by reference herein:

Ser. No. 08/846,590, filed Apr. 30, 1997, by Edward J. Paluch, entitled Memory Address Generation For Digital Video, now abandoned;

Ser. No. 08/865,749, filed May 30, 1997, by Bublil et al., entitled Special Purpose Processor For Digital Audio/Video Decoding, now U.S. Pat. No. 6,012,137;

Ser. No. 08/866,419, filed May 30, 1997, by Ozcelik et al., entitled Task And Stack Manager For Digital Video Decoding, now U.S. Pat. No. 5,928,321;

Ser. No. 09/001,122, filed Dec. 30, 1997, by Bose et al. entitled Motion Compensated Digital Video Decoding and Buffer Memory addressing Therefor, now U.S. Pat. No. 6,215,822;

Ser. No. 09/001,129, filed Dec. 30, 1997, by Bose et al. entitled Motion Compensated Digital Video Decoding with Buffered Picture Storage Memory Map, now U.S. Pat. No. 6,088,047;

Ser. No. 09/177,261, filed Oct. 22, 1998, by Duruöz et al., entitled Method And Apparatus For a Virtual System Time Clock For Digital/Audio/Video Processor, now U.S. Pat. No. 6,363,207;

Ser. No. 09/178,803, filed Oct. 26, 1998 by Duruöz et al., entitled Management of Trick Playback of Digital Video Data, now abandoned;

Ser. No. 09/281,152, filed Mar. 30, 1999, by Duruöz et al., entitled Trick Playback of Digital Video Data, U.S. Pat. No. 6,654,539;

Ser. No. 09/281,599, filed Mar. 30, 1999, by Fang-Chuan Wu, entitled On Screen Display, now U.S. Pat. No. 6,493,005; and Ser. No. 09/281,373, filed Mar. 30, 1999, by Fang-Chuan Wu, entitled Display Master Control, now U.S. Pat. No. 6,437,787.

FIELD OF THE INVENTION

The present invention relates to digital video presentation, and particularly, to systems and methods for converting frame rates of decoded MPEG video streams for display. More particularly, the present invention relates to the determination and control of frame conversion and field display sequencing in MPEG video receiving and presentation systems, including those of differing configurations.

BACKGROUND OF THE INVENTION

A standard for digital video and audio programs for broadcast and for recordings such as video compact disks (VCD) has been established by the Motion Pictures Expert Group (MPEG) chartered by the International Organization for Standardization (ISO). Such standards for digital video and two channel stereo audio were established and known as MPEG-1, more formally, as ISO-11172. An enhanced standard, known colloquially as MPEG-2 and more formally as ISO-13818, has been established to provide for enhanced quality and for specifying data formats for broadcast and other higher noise applications as well as digital video disks (DVD) and other higher resolution recorded media.

The MPEG video standard specifies a bitstream syntax that typically provides transformation blocks of 8×8 luminance pels (pixels) and corresponding chrominance data using Discrete Cosine Transform (DCT) coding. The DCT coding is performed on the 8×8 pel blocks followed by quantization, zigzag scan, and variable length coding of runs of zero quantized indices and amplitudes of the indices. Motion compensated prediction is employed. For video, MPEG contemplates Intra (I) frames, Predictive (P) frames and Bidirectionally Predictive (B) frames. The I-frames are independently coded and are the least efficiently coded of the three frame types. P-frames are coded more efficiently than are I-frames and are coded relative to the previously coded I- or P frame. B-frames are coded the most efficiently of the three frame types and are coded relative to both the previous and the next I- or P-frames. The coding order of the frames in an MPEG program is not necessarily the same as the presentation order of the frames. Headers in the bitstream provide information to be used by decoders to properly decode the time and sequence of the frames for the presentation of a moving picture.

The video bitstreams in MPEG systems include a Video Sequence Header, which is the primary definition of the entire video sequence. The Video Sequence Header contains picture size and aspect ratio data, bit rate limits and other global parameters. In MPEG-2, various Sequence Extensions may also be included that contain other information applicable to all pictures of the sequence, including a Progressive Sequence bit which indicates that the sequence contains only Progressive Frame pictures, a Chrominance Format code, information indicating the frame rate at which the original picture was encoded including original video format (e.g., NTSC, PAL, other) and other variables. Following the Video Sequence Header and Sequence Extension are coded Groups-Of-Pictures (GOPs), which are the components of the sequence that enable random access of the video stream. Each GOP usually includes only one I-picture and a variable number of P- and B-pictures. Each GOP also includes a GOP header that contains presentation delay requirements and other data relevant to the entire GOP. Each picture in the GOP includes a Picture Header, which is the primary coding unit that contains picture type and display order and delay data and other information relevant to the picture, including whether the picture is an I-, P- or B-picture, whether the picture is a frame or a field picture, whether a frame picture is a progressive frame or interlaced video, whether the field is to be repeated (3:2 pull-down as described below), field display order and other parameters.

Each MPEG picture is divided into a plurality of Macroblocks (MBs), not all of which need be transmitted. Each MB is made up of 16×16 luminance pels, or a 2×2 array of four 8×8 transformed blocks of pels. MBs are coded in Slices of consecutive variable length strings of MBs, running left to right across a picture. In MPEG-2, slices may begin and end at any intermediate MB position of the picture but must respectively begin or end whenever a left or right margin of the picture is encountered. Each Slice begins with a Slice Header that contains information of the vertical position of the Slice within the picture, information of the quantization scale of the Slice and other information such as that which can be used for fast-forward, fast reverse, resynchronization in the event of transmission error, or other picture presentation purposes. The Slice Header primarily facilitates resynchronization, refresh and error recovery.

The Macroblock is the basic unit used for MPEG motion compensation. Each MB contains an MB Header, which, for the first MB of a Slice, contains information of the MB's horizontal position relative to the left edge of the picture, and which, for subsequently transmitted MBs of a Slice, contains an address increment. Not all of the consecutive MBs of a Slice are transmitted with the Slice. The MB Header identifies the macroblock type, such as Intrafield predictive which is restricted to only pels from the current frame, or Interfield predictive which allows copying of pels from a previous frame. The MB header also defines Motion Vector Type, DCT_type (frame or field DCT), the motion vectors, the blocks that are encoded and macroblock parameters. The individual 8×8 pel blocks, four of which make up the macroblock, have no headers and are the basic transform and compression unit.

The presentation of MPEG video involves the display of video frames at a rate of, for example, twenty-five or thirty frames per second (depending on the national standard used, PAL or NTSC, for example). Thirty frames per second corresponds to presentation time intervals of approximately 32 milliseconds. The capacity of MPEG signals to carry information is achieved in part by exploiting the concept that there is typically a high degree of correlation between adjacent pictures and by exploiting temporal redundancies in the coding of the signals. Where two consecutive video frames of a program are nearly identical, for example, the communication of the consecutive frames requires, for example, only the transmission of one I-picture along with the transmission of a P-picture containing only the information that differs from the I-picture, or Reference Picture, along with information needed by the decoder at the receiver to reconstruct the P-picture from the previous I-picture. This means that the decoder must have provision for storage of the Reference Picture data.

Information contained in a P-picture transmission includes blocks of video data not contained in a Reference I- or P-picture, as well as data information needed to copy data into the current picture from a previously transmitted I- or P-picture. The technique used in MPEG systems to accomplish P-picture construction from a Reference picture is the technique of Forward Prediction in which a Prediction in the form of a Prediction Motion Vector (MV) is transmitted in lieu of the video data of a given or Target MB. The MV tells the decoder where and how to extract a 16×16 block of pixel data from the I- or P- Reference Picture to be reproduced as the Target MB. If needed, a Prediction Error is transmitted in the form of an error block that contains pixel data needed to supplement the copied motion compensated data in order to complete the current picture.

With B-pictures, the Bidirectional Temporal Prediction technique called Motion Compensated Interpolation is used. Motion Compensated Interpolation is accomplished by transmitting, in lieu of all of the video data for a Target MB, an MV that specifies which 16×16 block of pixels to copy either from the previous Reference Picture or from the next future Reference Picture, or from the average of one 16×16 block of pixels from each of the previous and next future Reference Pictures. By "previous" reference picture is meant a reference I- or P-picture that has already been displayed and is used for motion compensation prediction of subsequent pictures that have yet to be displayed. By "future" reference picture is meant a picture that is to be displayed in the future, but which will have been contained in the input signal bitstream and received before the current picture to permit the copying of data from it. With the motion vector, an Error Block of only the data, if any, that cannot be supplied by copying from the referenc pictures is transmitted in pixel data form.

Motion compensation vectors in current MPEG P- and B-pictures specify relocation of pixel data to the nearest half pel. This requires that the MPEG decoders perform a half-pel interpolation of luminance and chrominance values from adjacent pixel data in a 16×16 sized block copied from the reference picture in order to arrive at the luminance and chrominance values for the pixels of the macroblock in the current picture. Typical MPEG video decoders carry out this half-pel interpolation upon the performance of the motion compensation as the current picture is being written to the output buffer. With standard resolution systems, the output macroblocks will have the same number of pixels as the reference macroblocks, so that after the half-pel interpolation, the original copied pixel values will be discarded. The resolution of the resulting current picture typically approaches that of the reference picture, which may be a slightly degraded reproduction of the original picture. The addition of half-pel interpolation to motion compensation of video programs enhances the quality of the output when presented in the original resolution.

Video presentation systems produce rectangular images by scanning horizontal lines, from top to bottom, on a screen. The images are formed of rectangular arrays of pixels, for example, at 720 pixels per scan line, with 480 scan lines per picture under the NTSC standard for the current resolution standard used in the United States and Japan and 576 scan lines per picture under the PAL standard for the current resolution standard used in Europe. Standard definition programs are displayed in two formats. Under the NTSC standard, images are displayed at a rate of 30 pictures per second while under the PAL standard, images are displayed at a rate of 25 pictures per second. Under both standards, each image is displayed as two successive fields, a top field that includes the even lines of a picture and a bottom field that includes the odd lines of a picture. Under NTSC, 60 fields per second are displayed. Under PAL, 50 frames per second are displayed.

Frequently it will be necessary to display a program that is broadcast or recorded under one standard, NTSC or PAL, on a system that is configured to display under the other standard. Such cases require frame rate conversion from one rate, 60 or 50 fields per second, to the other rate. Such conversions are from 6 to 5, or from 5 to 6, frames per second. The modes for such conversion are not specified by MPEG.

In addition, many programs to be displayed on systems of either the NTSC or PAL standards are broadcast or recorded from motion picture film, in full frame images at rates of 24 or 20 frames per second. In such programs, these progressive images are recorded with all of the odd and even scan lines interleaved and encoded by frame. Such programs must undergo a frame rate conversion for display in 30 frames per second NTSC or 25 frames per second PAL frame rates. These conversions can be (1) from 24 frames per second to 25 frames (50 fields) per second, (2) from 20 frames per second to 30 frames (60 fields) per second or (3) from 20 frames per second to 25 frames (50 fields) per second. This produces conversion ratios of from 4 to 5 frames per second, from 24 to 25 frames per second, from 2 to 3 frames per second, and again from 4 to 5 frames per second, respectively.

Digital Video Disc (DVD) recordings include information in the bitstream Picture Headers that specify which frames are to be repeated to convert, for example, the 24 frames per second of a motion picture recording to the 30 frames per second of NTSC video. Other programs such as Video Compact Disc (VCD) recordings do not specify which pictures are to be repeated in a conversion, even though, to play such recordings on a PAL or NTSC system, such conversion must be conducted by the receiver. Furthermore, when recordings are to be converted from PAL to NTSC, or NTSC to PAL, intelligence must be provided in the receiving system to define a repeat scheme that will effectively reproduce the program to the system video output standard.

Furthermore, straightforward conversion systems have had certain minimum buffer memory requirements. In addition, the specified repeat order of DVD programs also requires a minimum amount of buffer memory to implement. The conversion of 24 frame per second progressive frame motion pictures to 30 frame per second NTSC video traditionally employs a conversion scheme referred to as 3:2 pull-down, by which three fields are generated from two fields of a frame of the original picture by displaying one of the fields twice. In the case of a progressive frame encoding of a 24 frame per second motion picture film to NTSC 30 frame per second video, such 3:2 pull-down may include, for example, displaying three fields from the two fields of one received frame and then two fields from the next frame, followed by three from the next then two from the next. The sequence under MPEG is specified to be: top-bottom-top, then bottom-top, then bottom-top-bottom and then top-bottom from four consecutive frames of the original picture to produce five frames of display, that is, by displaying a ten field sequence out of every four frames of original data, for a 24 to 30 frame per second conversion ratio.

Frame rate conversions, particularly those requiring the repetition of frames or fields, affects the design of the receiver. To repeat a field of a picture, either the decoded field must be stored or the field or the same frame must be decoded more than once. This increases the decoder speed requirements, the required buffer memory, or both, affecting the cost and complexity of the receiver.

An additional problem presented by the variety of conversion requirements is the complexity of the video decoding needed to deal with the alternative conversion situations using methods of the prior art.

Furthermore, not all video presentation systems are to be used in applications requiring the high resolution and other capabilities of DVD or other MPEG compliant systems. Accordingly, in order to make the systems of differing performance capabilities available at optimum cost, video decoders and other system components should be capable of functioning in a variety of systems to provide a wide range of capabilities without imposing on all such systems the same memory and performance requirements. Since it is not economical to produce electronic circuits in small quantities for each application, prior art systems typically are not produced to economically serve each of the applications for which they are needed.

For all of these purposes, the need to make frame rate conversions has the propensity to increase the complexity and cost of the video decoding system or the size and cost of the video buffer memory.

There is a need, particularly for video presentation systems with standard resolution video programs, for efficient and reliable frame rate conversion to take place.

SUMMARY OF THE INVENTION

A primary objective of the present invention is to provide a video decoding system and method by which video programs can be efficiently and effectively converted from one frame display rate to another. It is a particular objective of the present invention to provide a video decoding system and method by which such frame display rate conversion can be made by repeating the display of fields from received pictures to display a greater number of fields in a given presentation time interval than the number of frames in the interval that are received in the original program.

A particular objective of the present invention is to provide an efficient and effective system and method for performing frame rate conversions such as, for example, 3:2 pull-down conversions including pull down in VCD and DVD and NTSC-PAL or PAL-NTSC conversions. More particular objectives of the invention include providing for such 3:2 pull-down while facilitating the use of commands such as pause, fast-forward, slow forward, reverse play and other such commands which are often referred to as "trick play" commands. Such objectives also include implementing frame skipping required in audio-visual synchronization.

Another objective of the present invention is to provide in an MPEG video decoder one module and routine to handle frame rate conversions and other frame rate related issues, as well as frame rate related issues that are dependent on the amount of available buffer memory of the system in which the decoder is used. A further objective of the present invention is to provide an MPEG video decoder that performs a single decompression and transformation method regardless of the occurrence of frame rate conversion and the conversion rate and regardless of differences in the display sequences due to the frame rate conversion, if any, employed, or due to buffer memory size.

A further objective of the present invention is efficient and effective use of buffer memory and to facilitate the use of minimally sized buffer memory to buffer decoded video picture sequences for display during regular play, where frame rate conversions are required for program viewing, and during trick play modes and transitions into and out of trick play modes, particularly while maintaining optimal display quality. An additional objective of the invention is to provide a memory management system operative to map decoded pictures to buffer memory and allocate buffer memory so as to allow for the sharing of memory locations by more than one field in a way that reduces memory requirements.

According to the preferred embodiment of the present invention, an MPEG video decoder is provided with a decompression and transformation section which decodes a full frame of video on command by a single method that applies regardless of buffer memory and frame rate conversion considerations that would otherwise call for differing display sequences of the decoded pictures. The decoder is provided with a display control module that handles all frame rate and field sequence issues in response to host configuration information, particularly buffer memory size and system type (NTSC or PAL), and to host command signals, such as trick play commands, as well as to information in the received bitstream, particularly the sequence and picture headers and extensions. The display control module handles these issues, in a way that allows the other components of the decoder and of the display output logic to operate in a simple and consistent manner.

In certain preferred embodiments of the invention, pictures are decoded in the order received and as buffer memory for the decoded pictures becomes available. The decoded pictures are assigned attributes that are stored in a table, with one attribute string associated with each decoded picture. Signals are sent to a field display logic section along with the memory address of the next field to be displayed along with the attributes needed for affecting proper display. These attributes designate which field of a picture is to be displayed (top or bottom), whether the memory is to be freed for use by the decoder as the field is being read for transmission to the display, and whether the decoder is to be enabled to decode the next picture as the field is being displayed.

In the certain preferred embodiments, default attributes are predicted based on frame rate conversion considerations and then modified to give consideration to field display sequence information accompanying the pictures of the program. The generation of attribute tables considers buffer memory size, and field display order is modified to the extent necessary to allow the program to be reproduced at a proper display rate even when memory is small, using opposite field data where necessary. The field sequence order facilitates the use of output buffers for B-frame data that is in the range of from 0.53 to 0.67 frames in size.

In various embodiments of the invention, use of available buffer memory is optimized by maintaining tables of offset variables and accessing a fixed table of memory pointers as fields of data are being displayed. The offset data tables are identified to the display logic, which uses the data in the offset tables to indirectly address rows of memory in which the consecutive rows of field data for the field to be output have been stored by the decoder. The decoder loads offset values into the offset tables as pictures are being decoded and rows of blocks of the picture are stored as memory becomes free. Preferably, two full frame reference picture buffers are provided for storing two decoded reference I- or P-pictures and one 0.53 to 1.0 frame buffer is provided to buffer B-pictures, while four offset variable tables are provided, one to hold address offsets for both reference picture buffers and three to hold offsets for up to three different B-picture fields that can be each at least partially present in the output buffer at one time.

The invention provides versatility for various temporal up-sampling and down sampling schemes, particularly frame rate conversion schemes, and its operation is particularly smooth. The invention supports the use of less than three full frames of buffer memory, particularly that referred to as 2.53 mode or 2.53 frame DRAM memory configuration, as well as three frame and four or more frame video buffer memory. The invention also supports various trick play modes and their use simultaneously with 3:2 pull-down. The system and method provide versatile conversion and the ability to handle conversions between PAL and NTSC, with and without 3:2 pull-down, in both VCD and DVD as well as other formats.

These and other objectives and advantages of the present invention will be more readily apparent from the following detailed description of the preferred embodiments of the invention, in which:

DETAILED DESCRIPTION OF THE PREFERRED EMBODIMENTS

Figure 1:
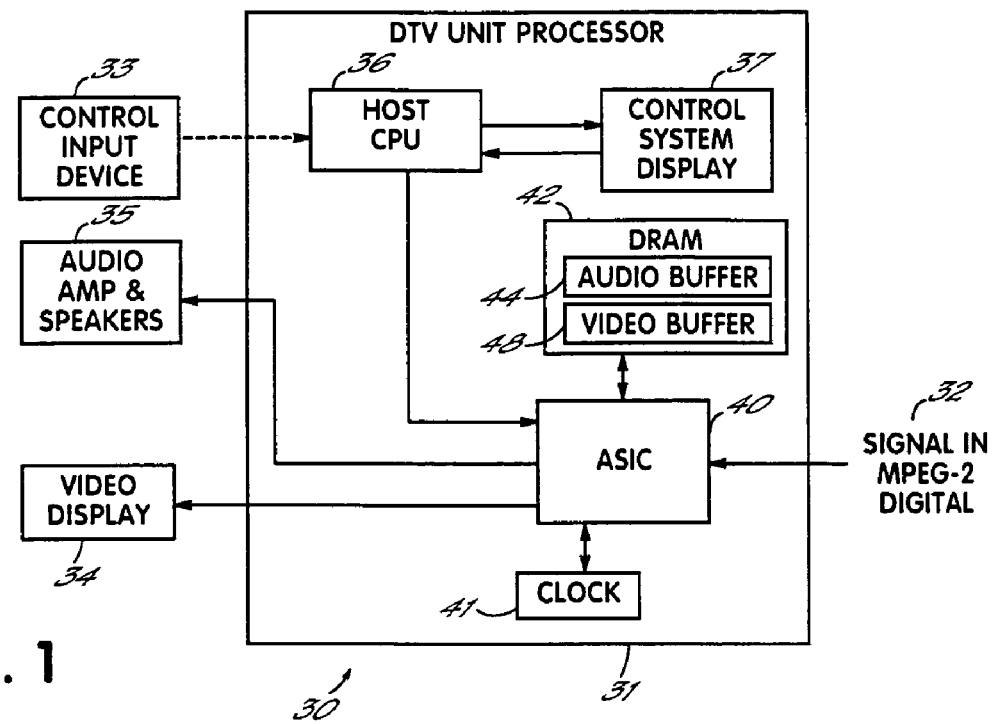
FIG. 1 is a block diagram representing an MPEG receiver embodying principles of the present invention.

One embodiment of the present invention is diagrammatically illustrated in FIG. 1 in the form of a digital television (DTV) audio and video presentation system 30. The system 30 includes a signal processor and controller unit 31 having a program signal input 32 in the form of an antenna, a cable, CD ROM or other medium through which a digital input signal is received, a control input from a control input device 33 through which a user makes program and presentation format selections, a video output which connects to a video display or video presentation subsystem 34, and an audio output which connects to an audio amplifier and speaker system or audio presentation subsystem 35.

The unit processor 31 includes a central processing unit or host CPU 36 which is programmed to process user commands from the control input device 33 and to operate a control system display 37, which displays information, menu selections and other information to the user and which may or may not also function as an input device. The unit processor 31 also includes an Application Specific Integrated Circuit or ASIC 40, which, when provided with configuration and selection information by the host CPU 36, decodes the raw digital bitstream signal from signal input 32 for output to the video and audio presentation devices 34 and 35. The unit processor 31 further includes a local system clock 41, which connects preferably to the ASIC 40, and a buffer memory 42. The buffer memory 42 is in-line, sequential memory, such as dynamic random access memory or DRAM, which may be, for example, synchronized DRAM or SDRAM. The buffer memory 42 is preferably a contiguous variable length audio buffer 44 for use by the ASIC 40 for audio signal processing and a video multiple picture buffer 48 for use by the ASIC 40 for decoded video processing.

Figure 2:
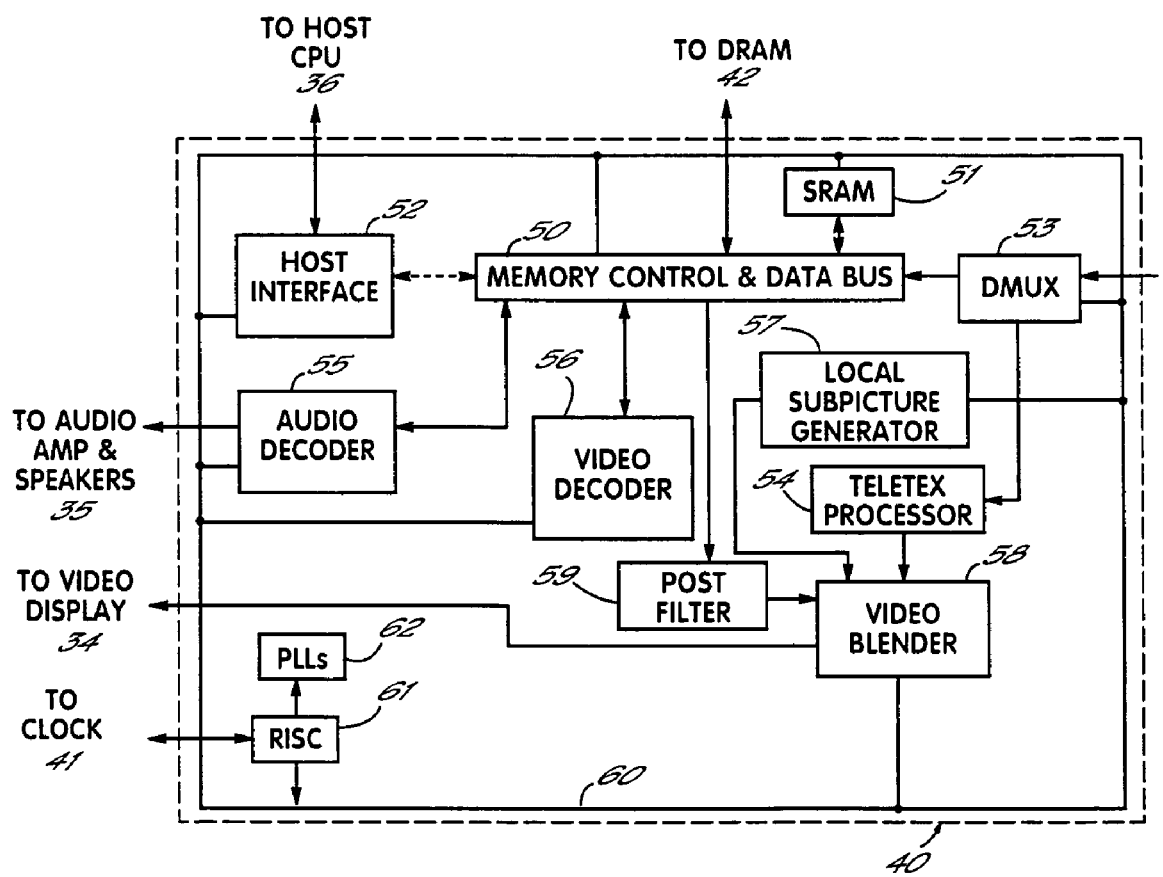
FIG. 2 is a block diagram representing the ASIC portion of the receiver of FIG. 1.

FIG. 2 diagrammatically illustrates the configuration of the ASIC 40. The ASIC 40 is a single integrated circuit chip that is logically divided into a number of components or functions. The ASIC 40 includes a memory control and a data bus or gbus, represented diagrammatically by memory controller and bus 50, which has at least one received data input connection and a plurality of data connections to the ASIC 40 and the DRAM 42. The ASIC 40 has distributed among its various modules on-chip static random access memory or SRAM, illustrated diagrammatically at 51. The connections of the bus 50 include a connection host interface unit 52 which connects externally with the host CPU 36, and connections to the DRAM module 42 which is external to the ASIC 40.

The ASIC 40 also includes a demultiplexer or DMUX 53 which has an input connected to the signal input 32 of the unit processor 31 and an output connected to the received data input of the bus and memory controller 50. The DMUX 53 also may have a text output connected to a teletex processor 54 that is also provided on the ASIC 40 for processing collateral information such as closed caption script, interactive menus and other text like data. The ASIC 40 further includes an audio decoder 55, a video decoder 56 and a local sub-picture generating unit 57. The audio decoder 55 has an input connected to one of the data connections of the bus 50 and an output connected externally of the unit processor to audio presentation subsystem 35. The video decoder 56 has data connections to and from the bus 50 from which it received coded video data to process. The video decoder 56 decodes by decompressing, transforming and motion compensating the received video data, and sends decoded and processed video picture data through bus 50 to a video buffer 48 in the DRAM 42.

The sub-picture generating unit 57 generates local picture information that includes control menus, display bar-graphs and other indicia used in control interaction with the user. A blender 58 is provided which combines the local video from the sub-picture unit 57 with teletex information from the teletex processor 54, and decoded video from the video buffer 48 of DRAM 42 that has been post-processed by a post-filter section 59 of the ASIC 40. The output of the blender 58 is connected externally of the unit processor 31 to the video presentation subsystem 34.

The ASIC 40 is provided with a control bus 60 to which a control port of each of the components of the ASIC is connected to receive control signals in response to which they operate. The ASIC 40 includes a Reduced Instruction Set Controller or RISC 61, which serves as the local CPU of the ASIC 40. The RISC 61 controls the functions of the components of the ASIC 40 by generating control signals and applying them through control data ports onto the control bus 60. The RISC 61 has a clock input that connects externally of the ASIC 40 to the local system clock 41, and has another input connected to phase locked loop circuitry or PLLs 62 within the ASIC 40 used to time internal clock signals.

Figure 3:
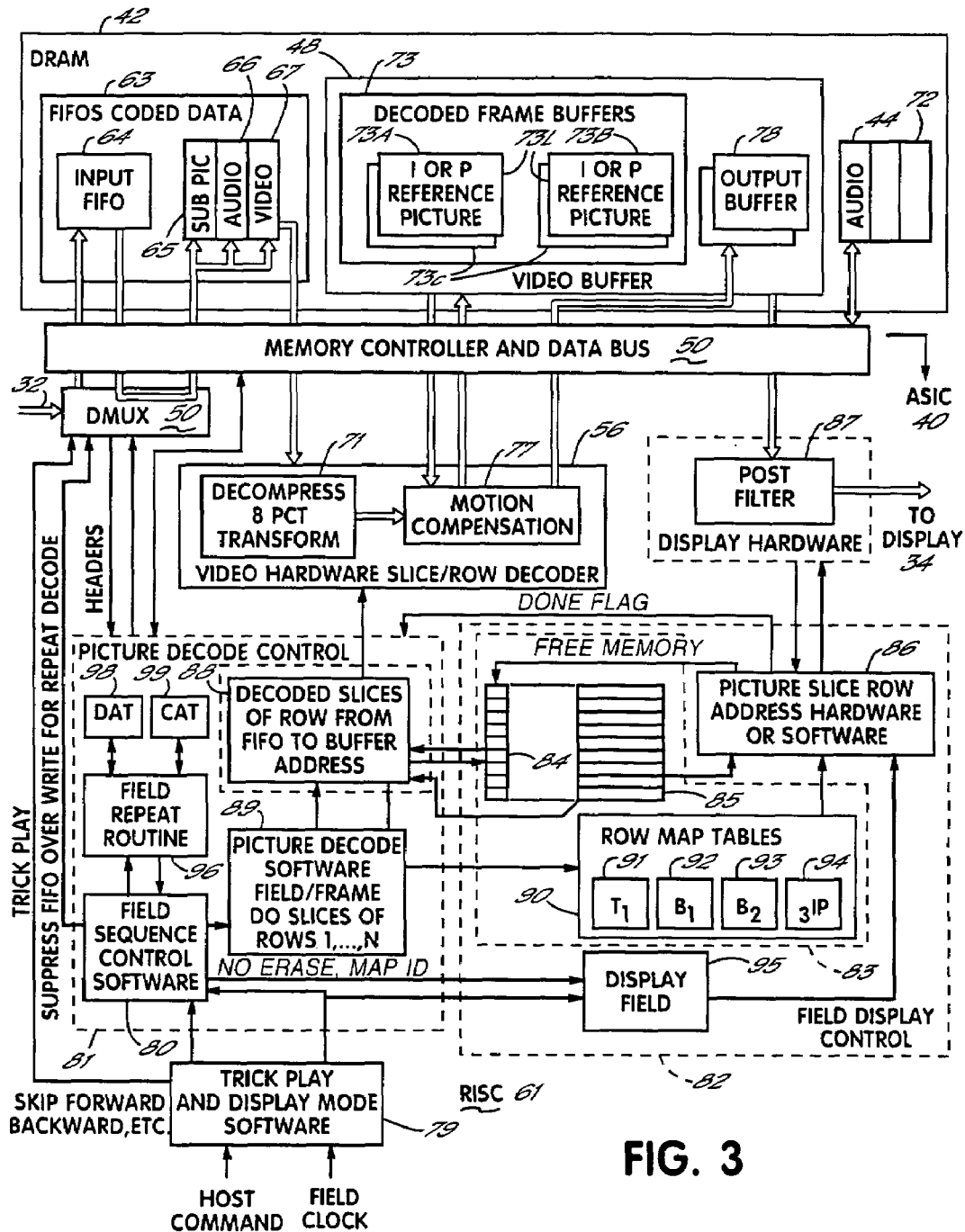
FIG. 3 is a detailed block diagram representing the DRAM buffer and video decoder portions of the MPEG receiver of FIGS. 1 and 2.

The information flow and memory configuration is illustrated in the simplified block diagram of FIG. 3, which shows the raw signal of the incoming bitstream at input 32 entering the DMUX 53 which extracts and sends certain headers to the RISC 61 and routes data through the data bus 50 to an input FIFO buffer 63 in the DRAM 42. Preferably, the raw encoded data from the bitstream is first buffered in an input portion 64 of the FIFO buffer 63 as the data is received, from which the DMUX 53 then reads the data through the bus 50, separates video, audio and sub-picture data, and then writes this separated data through the bus 50 and into respective separate FIFO buffers: one FIFO buffer 65 for sub-picture data from the host, one FIFO buffer 66 for encoded audio data and one FIFO buffer 67 for encoded video data.

The FIFO buffers 63 are part of the random access DRAM 48, but are caused to function as first-in/first-out ring memory by the programming of the DMUX 53 and the memory controller 50. These FIFO buffers 63 have read and write pointers which automatically determine the addresses to and from which the next write and read commands write and read. The positions of these read and write pointers can be read by the RISC 61 and can be set by the RISC 61. As a result, the RISC 61 can move a read pointer of, for example, video FIFO 67 to repeat or skip a picture, and can suppress the advance of the write pointer to prevent or cause a picture from being overwritten to facilitate the repeating, skipping, or reordering of pictures where desired. This accommodates frame rate conversions and certain trick play modes.

The video decoder 56 takes encoded video data one slice at a time from the read pointer location in video input FIFO buffer 67 and processes the data macroblock by macroblock in a decompression and transformation section 71, which extracts information from slice and picture headers for interpretation internally by the decoder 56. Higher level headers, such as sequence headers and GOP headers which were extracted by the DMUX 53 are interpreted by the RISC 61. The interpretation of higher level headers may involve storage of information to SRAM 51 on the ASIC 40 or to a portion 72 of the DRAM 42 reserved for the storage of decoded header information, miscellaneous parameters and other such data. For example, information in the Video Sequence Header may contain picture size and aspect ratio data that might be used by the ASIC 40 to reassign memory segment labels to the video buffer 48 of DRAM 42 and to keep track of the sizes in the buffer memory 48 of the buffers needed for data buffering of reference pictures and the output picture.

The processing of picture data by the video decoder 56 is performed on a slice or slice row basis in response to commands from slice decode software 88 in the RISC 61 which instructs the decoder 56 to read a slice or row of slices from the video FIFO 67, to decode the macroblocks of the slices so read, and to store the decoded row to DRAM 42 at an address provided by the RISC 61. These addresses may be to any one of the video buffers 73A, 73B or 78, depending whether the decoded video is of a reference I- or P-picture or of a B-picture that is being processed for direct output to the display 34. The slice decode software 88 is controlled by picture decode software 89 of the RISC 61 to instruct the video decoder 56 to decode all of the rows of a picture.

The decoding process controlled by one cycle of the picture decode software 89 may include the decoding and storing of at most one full frame of decoded I picture frame data in either one of two full frame reference picture buffers 73A,73B of a video frame buffer portion 73 of the DRAM memory 42. Such I-pictures are inverse DCT decoded and stored in the reference picture buffers without motion compensation and the copying of data from previously stored reference pictures.

The processing by the video decoder 56 includes the performance of an inverse DCT on the data by decode and decompression section 71 and the application of motion compensation calculations to the transformed data by a motion compensation section 77 of the video decoder 56. The motion compensation section 77 constructs P-picture frame data for storage in one of the reference picture buffers 73A,73B by copying and relocating pixel data from a buffered I or P-picture stored in the other one of the buffers 73A,73B. The P-pictures are produced by copying data from the frame picture in such other buffer according to motion vector data in the received signal that is read from the video FIFO buffer 67 by the video decoder 56.

The video decoder 56 decodes and performs motion compensation calculations for the construction and buffering of B-picture fields by copying and averaging data from an I-picture and a P picture, or two P-pictures, read from the reference picture buffers 73A-73B. The B-pictures so constructed are written as one or two fields into an output buffer 78 in DRAM 42. The output buffer 78 is a one full frame picture in size in some embodiments, and in other embodiments is less than one full frame, but at a minimum is larger than one half frame (one field) of a picture by an amount equal to at least one horizontal row of 8×8 video data blocks, and preferably by an amount equal to at least one horizontal row of 16×16 video macroblocks, which is two rows of 8×8 video blocks. Picture data is displayed by outputting field pictures sequentially from the output buffer 78, line by line, through the post filtering section 59 and to the video display 34.

Both of the video buffers 73 and 78 are divided into two parts, one 73L,78L for storing pixel luminance data and one 73C,78C for storing pixel chrominance data. This is represented by the two layers depicted in FIG. 3 for the buffers 73 and 78. A master control program in the RISC 61 assigns Base_Addresses and Buffer_Sizes to each of the parts -L and -C of each of the buffers 73A, 73B and 78, as well as a row index increment that is derived from the Horizontal_Width of the pictures of the sequence. The Base Addresses and Buffer_Sizes can be changed as picture format changes in the received program. Further, since frame sizes can vary from program to program, a host DRAM configuration 42 that constitutes a 2.5+ buffer for one program can be a three frame buffer for another program. For example, a 2.53 buffer for an MPEG-2 program is more than adequate to store three frames of an MPEG-1 program. Lower cost host systems in which the ASIC 30 can be used may be provided with a minimum DRAM 42 necessary to provide at least a 2.533 frame for the highest definition or largest frame size that the system is expected to present. Other higher performance systems will provide larger buffer memories of, for example, five times the largest frame size expected for optimal performance. With larger buffer memories, the control program of the RISC 61 continuously reassigns the Base_Address of the next buffer for the optimum use of available memory and for optimal preservation of data to meet the highest performance requirements. Such a higher performance system is explained in related applications Ser. No. 09/178,803, Management of Trick Playback of Digital Video Data and Ser. No. 09/281,152, entitled Trick Playback of Digital Video Data referred to above.

According to the preferred embodiment of the invention, the RISC 61 includes field sequence control logic 80 to control the order of field data to the buffer 78, including the performance of frame rate conversions. Conversions that are made include, for example, 3:2 pull-down conversions from 20 or 24 frame per second VCD or DVD to 25 frame per second PAL or 30 frame per second NTSC, as well as NTSC-to-PAL and PAL-to-NTSC conversions. The conversions are implemented while facilitating the use of commands such as pause, or may be suspended during other commands such as fast-forward, slow forward, reverse play and other trick play modes. In addition, the field sequence control logic 80 includes field repeat routine logic for determining the repeating of fields to be done when frame rate conversions so require, and for implementing frame skipping in audio-visual synchronization and in other situations where frame skipping is required.

This field sequence control logic 80 is contained in a single module within the RISC 61 which, along with a field sequence attribute setting subroutine 96, includes the entire routine needed to handle frame rate conversions and other frame rate related issues. In addition, the control logic 80 controls other frame rate related issues that are dependent on the amount of buffer memory provided by the many various forms of system 30 in which the ASIC 40 is used. The control logic 80 controls these issues by determining the appropriate field display sequence, synchronizing the operation of the decoder 56, instructing the DMUX 53 if necessary, and mapping and timing the storing of decoded video slice data to the output buffer 78 to carry out the field display sequence that the control logic 80 determines is appropriate. The control logic 80 allows a single decompression and transformation method regardless of the occurrence of frame rate conversion and regardless of the determined field display sequence or the inclusion therein of field repetition or field skipping. It accommodates output field buffers 78 that are one frame in size and buffers that are smaller, such as output buffers 78 that are only one or a few block-rows larger than one half frame (one field).

In general, when video data of a bitstream is received by the DMUX 53, Video Sequence Header information is extracted containing picture size and aspect ratio data, bit rate limits and other global parameters. Video Sequence Extensions are also included in some sequences which may also contain other information applicable to all pictures of the sequence such as a Progressive Sequence bit which indicates that the sequence contains only Progressive Frame pictures, a Chrominance Format code, original video format (e.g., NTSC, PAL, other) and other variables. In MPEG-2, such parameters can be changed in the course of a program by information in the Sequence Header or Sequence Extension. This header and extension information is communicated to the RISC 61 for use in processing and displaying the pictures of the sequence.

In the same manner GOP Headers and, in MPEG-2 GOP Extensions, are also received by the DMUX 53 and communicated to the RISC 61. In the video decoding and presentation process, as groups-of-pictures (GOPs) of each sequence are received, presentation delay requirements and other data relevant to the I-picture and all of the P- and B-pictures in the entire GOP are extracted from the GOP Header and interpreted by the RISC 61, which instructs the video decoder and other ASIC components.

As each picture of the GOP is received, a Picture Header is extracted and interpreted by the RISC 61 to determine the picture type (e.g., I, P or B), the display order of the picture relative to other pictures or its relative place in the stream, and relevant other information concerning the picture. The Picture Header in MPEG-2 is accompanied by a Picture Extension that includes information on picture structure including whether the picture is a frame DCT picture or a field DCT picture, and if field DCT, whether of a top or bottom field and bits indicating whether to display top or bottom field first, whether to repeat the first field, as where frame rate conversion is required, and other variables. In response to information in these headers, the RISC 61 controls the video decoder 56, particularly the decompression and transformation section 71, and the memory controller and bus 50 to decode and store the picture data from the picture in one of the buffers 73A, 73B or 78 of the DRAM 42.

The decoding and storage of the picture data involves the processing of Slices of consecutive variable length strings of macroblocks (MBs) and storing them in specific memory locations assigned to the specific MBs, preferably in accordance with memory mapping and addressing techniques described in U.S. patent applications Ser. Nos. 09/001,122 and 09/001,129, both filed Dec. 30, 1997, hereby expressly incorporated by reference herein. A slice decoding software section 88 of the RISC 61 instructs the decoder 56 so that it decodes the one or more slices necessary to process an entire picture row of macroblock data. In reading the data, a Slice Header is read and interpreted to verify its location in the picture and other parameters needed for decoding, such as quantization scale and other information that may vary from slice to slice. MB Headers for each macroblock are similarly read for horizontal position information. The video decoder 56 is a slice decoder which is triggered by a command from the RISC 61, in response to which it retrieves a slice of video data from the input video FIFO buffer 67. The decoder 56 decodes this slice data, and stores to the DRAM 42 in one of the buffers 73A, 73B or 78 in a row thereof that is specified in the command from the RISC 61. This storage includes the storage of both luminance and corresponding chrominance data in respective parts of the appropriate buffer. The decoder 56 is able to process 16 lines of picture data at a time. For frame encoded pictures, this amounts to one horizontal row of 16-line macroblocks. For field encoded pictures, two rows of 8-line macroblocks are processed.

In particular, for I- and P-pictures, the decompression and transformation section 71, under control of the RISC 61, tends to the performance of inverse discrete cosine transform decoding (IDCT) and buffering, in a reference picture buffer 73 of the video buffer 48, full frame reference pictures, either in the form of an I-picture, which is stored without reference to data from previously received pictures, or of a P-picture, which is stored after copying data from a previously received I- or P-picture. Such a reference picture is preferably stored as a full-frame picture containing the alternately even and odd scan lines of the frame in the top to bottom order in which they will appear in the displayed picture.

In the preferred embodiment, two portions of the buffer 73, portions 73A and 73B, store the previous full frame picture in the form of an I or a P-frame and the next full frame picture in the form of a P frame. Such P-frames are written to this memory 73 by copying, with or without motion compensation, portions of the previous picture from the other portion 73A,73B of the buffer 73. When a further P-frame is received, it overwrites one of the frames in the memory portions 73A or 73B, typically the earlier of the two in presentation order, to become the next, "next" frame, while the frame in the other portion 73A or 73B of the buffer becomes the next "previous" frame. When a further I-frame is received, it will overwrite one of the frames in the memory portions 73A or 73B. Storage of a frame picture in either of the buffer memory portions 73A or 73B involves storage into halves 73L and 73C of such buffer portion, the respective luminance and chrominance data for the picture being stored.

When an I-picture is received, it is stored in one of the full frame reference picture buffers 73. An I-picture is also read from its reference picture buffer 73 to the post filtering section 59 of display hardware 87 when it is to be displayed. When a P-picture is decoded, extrapolation of the data from a stored I- or P-picture is carried out for each macroblock in accordance with a motion included in the macroblock data, and the P-picture is stored in one of the full frame reference picture buffers 73. When a B-picture is received, interpolation of the data from two stored reference pictures is carried out by copying data in accordance with motion vector data from the macroblocks. B-picture data is decoded in presentation time order and is accordingly written directly to the output buffer 78. In the case of P-pictures, the full frame P-picture is constructed and stored in one of the portions 73A,73B of the buffer 73 from data copied in part from the previous I- or P-picture in the other portion 73B,73A of the buffer 73. The motion compensation processing is handled by a motion compensation portion 77 of the hardware of the video decoder 56.

The parsing of data to the reference picture buffers 73 may be carried out in a straight-forward manner, utilizing the base address of the respective buffer and a row index corresponding to the vertical position of the slice in the picture, or it may be carried out dynamically, which is the way in which slice level parsing of the output buffer 78 is achieved. The output buffer 78 has a size within a range, preferably, of from one row of blocks or macroblocks more than one half of a frame up to a full frame. Slice level parsing is achieved by dynamically allocating empty rows in buffer 78 of the DRAM 42. When the buffer 78 is less than a full frame in size, the parsing of slices when stored to the buffer 78 as well as the decoding of pictures and the outputing of lines to the display must be particularly controlled.

The RISC 61 has a section 79, which connects with the host interface 52 and clock 41 of the ASIC 40, to control the display mode and timing and trick play operations such as fast and slow forward, pause and reverse. This trick play and display mode section 79 receives timing information from the system field clock 41 and user control signals from the host control input 33. The section 79 sends commands to a picture decode control 81 and to a field display control 82. It informs the field display control 82 when a buffered decoded picture is to be output and tells the decode control 82 which pictures to next decode and write to the buffers. It also signals the decode control 81 and also directly controls the DMUX 53 to implement the picture sequences necessary to produce trick play modes such as fast and slow forward, reverse, pause, skip, etc.

The decode control 81 controls the order in which picture data is decoded and ultimately sent to the output buffer 78 as well as the reference picture buffers 73. The decode control 81 controls the decoding process by the video decoder 56 and those operations of the DMUX 53 that relate to the timing of picture decoding and decoding order. The picture decode control 81 includes the field sequence control 80 and the field repeat subroutine thereof 96, the picture decode software 89 and the slice decode software 88. It is a primary function of the picture decode control 81 to insure that pictures are decoded and the buffers 73 and 78 are loaded with decoded picture data in the order and by the times they are needed for reference or for display.

The display control 82 controls the outputting of decoded data to the display 34. The display control 82 includes a display time command routine 95 which responds to a field output timing signal from the display mode software 79 and attribute data from field sequence software 80 data to command the output of a specific field of a picture to the display. The command routine 95 communicates with address hardware and software 86 which determines the addresses of the buffer 42 from which slices of the buffered pictures are to be output and consecutively processes those slices to send them to the display. A memory management data section 83 of slice storage address data informs the address software 86 of the buffer locations from which the slices to be displayed are located. The memory management data section 83 is logically part of the display control 82 but may include tables that are physically stored in the buffer memory 42. The field display control 82 informs the decode control 81 of the storage locations that are freed by the output of slices of picture field data, while the decode control 81 keeps supplying decoded data of the next future pictures for display to the buffer memory 42 while informing the display control 82, by loading tables in the memory management data section 83, of the locations of the slices as they are decoded. The display control 82 reads slices of data, line by line, from field pictures stored in the picture buffers of DRAM 42 as the display is due, while the decode control 81 decodes the next pictures to be displayed and parses the decoded slices to the buffers as buffer space becomes available.

Preferably, the slice level parsing is achieved by allocating the first two available rows in the table for the storage of a slice that has been decoded by the decoder 56, since the motion compensation section 77 decodes 16-line macroblocks. The availability of the rows of the buffer 78 is maintained in a memory-empty flag table 84 of the memory management data section 83. The memory-empty flag field is made up of three 32-bit words, which is more than adequate to contain one Row_Empty bit for each of a maximum of 72 8-line rows of a PAL-format picture. Each one of the Row_Empty bits of the flag field or table 84 corresponds to one physical row of the buffer 78. Each such row has an offset address, relative to the Base_Address of the buffer 78, represented by a value in an address pointer table 85, having one row corresponding to each bit of the flag field table 84 and having two columns, one containing the offset address of the row in the luminance part of the buffer 78 and one containing the offset address of the row in the chrominance part of the buffer 78. The values of the offset pointers in the table 85 are fixed at the time the buffer 78 is defined. The bits in the flag table 84 are dynamically set to 1=EMPTY by memory allocation routine of address software 86 in coordination with display hardware 87, which contains the post-filter section 59 as well as the other routines for sending field pictures to the display 34. The bits in the field 84 are dynamically set to 0=FULL by a Slice_Decode command generating routine 88 within the RISC 61.

Picture_Decode signals specifying the slices of the picture that are to be decoded are sent to the slice decode command routine 88 by picture decode command routine 89 in the RISC 61. The picture decode command routine 89 specifies which one of three memory map tables 91-93 in a map table portion 90 of memory management data section 83 is to be used by the slice decode routine 88 to record the row of the buffer 78 into which a particular row of the picture was stored. Each table 91-93 is formed of 9 32-bit words of 4 8-bit variables each, which variables represent offsets from the base address of the pointer table 85, each of which contains the two memory addresses in the buffer 78 at which the luminance data and the chrominance data of the decoded slice are stored. The size of the table is sufficient to store indexes for the maximum 36 slice locations per field. Table 91 stores the locations of the first decoded B-field, while 92 and 93 store locations for the second decoded B-field. If the B picture is a frame picture, table 91 stores the top field, for example, while tables 92 and 93 store the bottom field. Two tables are used for the bottom field so that, in a three delay pipeline, for frame decoding cases, there are situations in which, while the bottom field is displayed, for example, the bottom field corresponding to the next picture may be decoded. When decoded rows of blocks are stored, one or two locations are written to a table. In the case of a field picture, two locations are written to the same table. In the case of a frame picture, one location is written to one table for the top field and one is written to one table for the bottom field.

In addition to tables 91-93, one fixed table 94 is provided for both the reference picture buffers 73. This table is set up when the buffers are configured and makes the addressing scheme for the reference pictures independent of the picture type. When the RISC 61 determines that a particular field is to be displayed, a Display_Field command is sent from the display mode routine 79 to display time command routine 95 with information for use by the memory allocation routine 86 and the display hardware 87, identifying the table 91-94 to be used for retrieval of the field data to be output. The memory allocation routine 86 retrieves the row locations from the designated one of the tables 91-94, retrieves the rows of the field in order from the addresses in the address table 85 identified by the location data from the table, and then sends the lines of the rows of retrieved blocks of the field to the display.

In preferred embodiments of the invention, the field display sequence control logic 80 in the RISC 61 synchronizes and controls the operation of decoder 56 and the control of the output buffer 78 (via the memory controller 50) to handle the sequencing of the outputting of fields from the buffer 78 to the display 54 as well as the upstream operations of the decoder 56 and memory controller 78 in decoding and storing the field data to the buffer 78. In certain embodiments of the invention, the sequence control logic 80 also has the capability of controlling the DMUX 53 and decoder 56 so as to time the reading of pictures from the FIFO video buffer 67 to the video decoder 56 and signal the DMUX 53 to allow or suppress the overwriting of the FIFO buffer 69 with new picture data, to support the multiple decoding or the skipping of video pictures.

The sequence control logic 80 determines the need for frame rate conversion and controls these functions so as to regulate the adding or skipping of fields or frames to bring about any frame rate conversion that is required to match the input video frame rate to that of the display 34. The sequence control logic 80 regulates the display sequence of the fields in response to information in the picture data bitstream and in accordance with configuration information and commands from the host. The information from the host to the control logic 80 includes configuration data relating to the size of the output buffer 78, information regarding the format of the receiver (e.g., NTSC, PAL, etc.) and commands such as trick play mode commands (e.g., pause, fast-forward, reverse, etc.).

The sequence control 80 determines the order in which fields are to be decoded and when and to where in the buffer memory 78 decoded slices are to be written. It controls when the video decoder 56 decodes these slices and tells the decoder 56 to which rows of blocks of the output buffer 78 the decoded slices are to be written. The control logic 80 stores information regarding the locations in the buffer memory 78 of the various rows of data from the various fields of the input pictures in tables 82 in the buffer memory 42. From information in the video bitstreams, or where the bitstream does not contain the information by making certain default assumptions, it determines the display sequence of the fields of the received pictures. Where the frame display rate required of the display 34 differs from that at which the original received program was recorded, the control logic 80 specifies which fields are either repeated or skipped to make the display of the picture sequence acceptable, and where possible, MPEG compliant.

Where the video decoder is fast enough and the output buffer is large enough, most display sequence conversions are straight forward. However, decoder speed and memory may be limited due to cost or other factors by host specifications. The field sequence control 80 facilitates the satisfactory use of lower speed decoders and, more particularly, of a host DRAM memory 42 that is relatively small in size. In certain embodiments, a full frame output buffer 78 provides for the necessary field repetition. In other embodiments, a more economically sized DRAM memory of about 0.53 to 0.60 frame is accommodated by repeating fields in a less optimum sequence. In still further embodiments, the use of limited DRAM memory is facilitated by decoding certain fields more than once from the input FIFO buffer 63, with the sequence control logic 80 controlling the DMUX 53 to prevent overwriting in the video FIFO 67 of frames that are to be repeated, while triggering the video decoder 56 on a slice-by-slice basis enables field repetition by rotating use of limited rows of the output buffer 78. The manner in which the field sequence control 80 accomplishes its objectives and performs its functions can be best understood from the examples below.

Full Frame Output Buffer

In the following set of examples, the DRAM buffer includes an output buffer 78 that is capable of storing a full frame output picture. The display 34, for example, may be configured to display a color image of 480 scan lines at, for example, 720 pixels per line, with lines interleaved from top and bottom fields. In an NTSC system, such fields are displayed at intervals of ⅙₀th second apart to output a full frame of the entire 480 odd (bottom field) and even (top field) lines in ⅓₀th second. The configuration of DRAM 42 in which the output buffer 78 is a single full-frame output buffer is referred to as a 3-frame video buffer configuration because it includes two full-frame reference picture buffers 73A and 73B plus the full-frame output buffer 78. A full-frame output buffer 78 includes, in these examples, storage for 480 scan lines or 60 8-line blocks or 30 16-line macroblocks. Data storage arrangements for such a full-frame output buffer 48 are illustrated in FIGS. 4A, 4B and 4C.

Figure 4D:
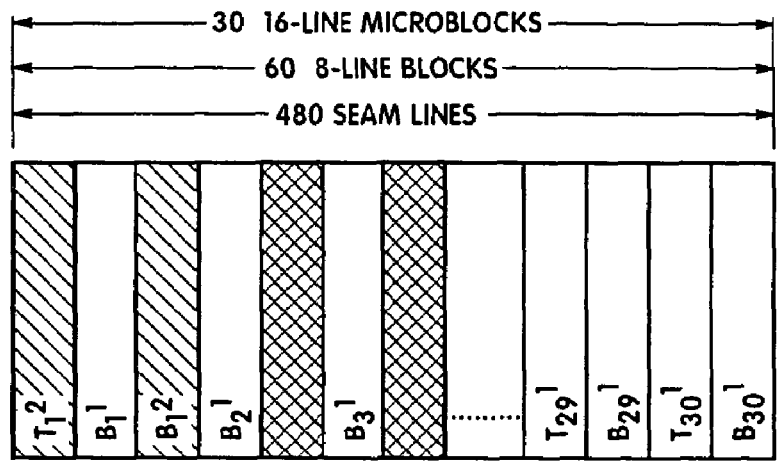
FIGS. 4A-4D are diagrams illustrating memory mapping alternatives for the buffer memory of the receiver portions of FIG. 3.
Figure 4C:
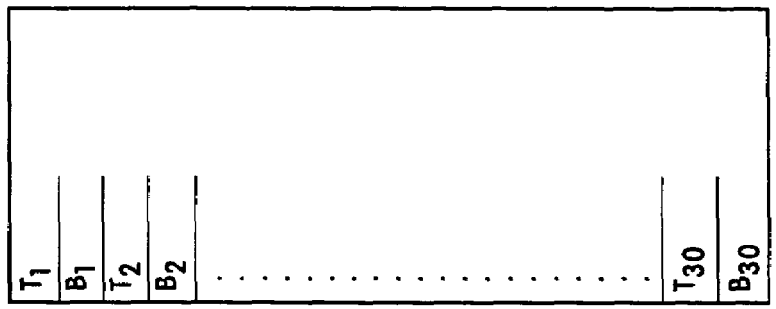
Figure 4B:
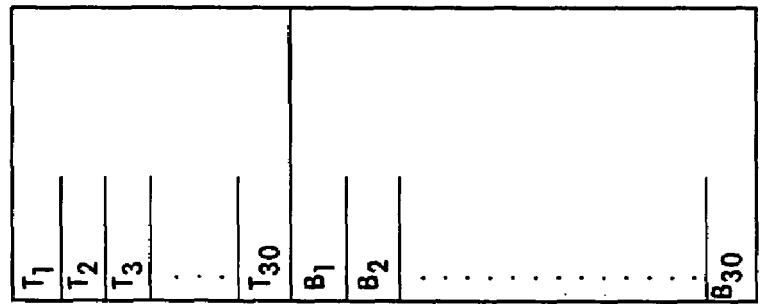
Figure 4A:
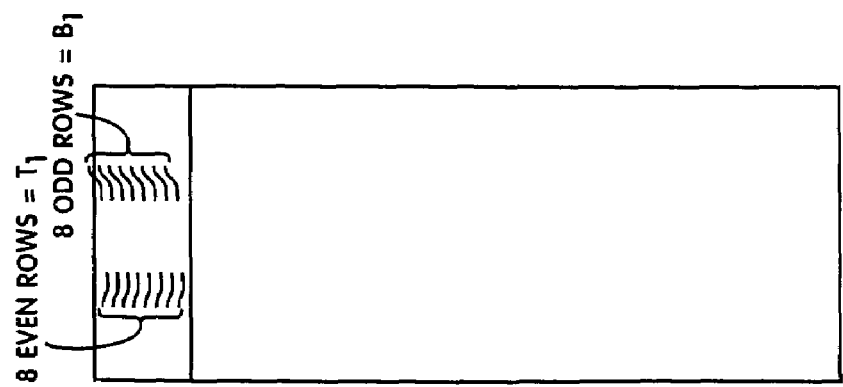

One configuration for storing decoded video data in a full-frame buffer is in 16-row macroblocks with the rows stored in order, 0, 1, . . . , 15, the rows of the top and bottom fields being interleaved, as illustrated in FIG. 4A. Such storage is more suitable for storage of reference pictures, which are sometimes used on a frame basis, than for pictures being output for display, which in entertainment systems are almost always displayed on a field basis, one field followed by another. In FIG. 4B, the output buffer 78 is illustrated with a full frame of video picture data stored with the 8 lines of the top fields $T_1, \ldots, T_{30}$ stored in adjacent rows in one half of the buffer 78 with the 8 lines of the bottom fields $B_1, \ldots B_{30}$ stored in adjacent rows in the other half of the buffer 78. In FIG. 4C, the output buffer 78 is illustrated with a full frame of video picture data stored with the 8 lines of the top fields $T_1, \ldots, T_{30}$ and the 8 lines of the bottom fields $B_1, \ldots B_{30}$ of each of the 30 rows of macroblocks stored separately, but with the field data of the macroblocks adjacent.

Where the pictures are DCT encoded by field, the field pictures are sequentially DCT decoded and written to the output buffer 78. With such field pictures, the output buffer configuration of FIG. 4B is convenient, as one field can be decoded and written to the one half of the buffer while a previously decoded field is being read from the buffer 78 to the display 34. With frame DCT encoded pictures, the top and bottom field lines of each slice are decoded together, so that the storage scheme of FIG. 4C is likely to be more convenient. With frame encoded pictures, the top and bottom fields of the entire picture will be written to the buffer 78 as one of the fields is being read out to the display 34. The display sequence control 80 keeps the rows of memory in which the slices of the top and bottom fields are stored by entries in a memory map table in table buffer 82 in DRAM 42. As all of the rows of blocks 1-30 of the top and bottom fields of a frame are written to the buffer 78 and all of the rows of one of the fields, for example the rows $T_1, \ldots, T_{30}$ of the top field, have been sent to the display, the entire 30 rows of the bottom field will remain in the buffer 78. The two fields of the next frame will be written to the buffer 78 after the upper rows of blocks of the bottom field have been read out. This allows the rows of blocks of the successive frames on the same corresponding rows of the memory, but delays the time available for the decoder 56 to decode the next frame.

FIG. 4D illustrates a storage technique which may start as that shown in FIG. 4C, but which stores the rows of blocks in the next available rows of memory as the fields are successively sent to the display. Assuming frame DCT encoded pictures of which the top and bottom fields must be decoded simultaneously, slice by slice, FIG. 4D illustrates the point in time in which the top field of the first frame $T^1$ is being output to the display. The rows of memory in which slices $T^1{}_1, T^1{}_2$ and $T^1{}_3$ have been output and these rows of memory are being overwritten by the slices of the top field of the next frame $T^2{}_1$ and $T^2{}_2$, while the blocks $B^1{}_1, \ldots, B^1{}_{30}$ of the bottom field of the first frame remain in the memory. This allows the decoder 56 to process the next frame at the earliest possible time. In this case, the display sequence control 80 keeps track of the changing contents of the various rows of the memory 78.

With all of the above mapping techniques, any field can be repeated if that is required due to a frame rate in the incoming data that is lower than that of the display 34. If the first field of a frame that is to be output (e.g., the top field) is to be repeated after the other field (e.g., the bottom field) of the frame is output, the display sequence control signals the decoder 56 to suspend decoding of the next frame until the second field is being displayed, and to delay the overwriting of the first field until the first field has been repeated. While all of the mapping techniques of FIGS. 4A-4D are useable, the technique of FIG. 4D is used in the examples, which relate to programs that include DCT frame encoded pictures.

EXAMPLE 1

The case where no frame rate conversion is required and a 3-frame video buffer is available includes the situation where pictures in the program have a display rate that is the same as that of the display 34, as, for example, a program of 30 frames per second being presented by a system having an NTSC display format. The output sequence of the fields of the successive frames of the picture, which are identified by the superscripts 1, 2, . . . etc., is either:

$T^1B^1, T^2B^2, T^3B^3, \ldots$, etc.

or $B^1T^1, B^2T^2, B^3T^3, \ldots$, etc., depending on which field of a frame is to displayed first. The solution is straightforward.

EXAMPLE 2

The case where 3:2 conversion is required with a 3-frame video buffer available includes the situation where, for example, a motion picture is encoded in progressive frames at 24 frames per second to be presented by a system having an NTSC display format of 30 frames (60 fields) per second. This requires a 4:5 frame rate conversion. In this case, every four frames of a program bitstream in the form of:

$T^1B^1, T^2B^2, T^3B^3, T^4B^4$ must be output as five frames. MPEG specifies that such conversion involve outputting the first field of the first frame twice as the first and third fields and outputting the second field of the third frame as the sixth and eighth fields of a ten field sequence. Fields of any given frame are output in the order TB, BT, TBT or BTB. For 4:5 frame rate conversion, the output sequence of the fields of the successive frames 1, 2, . . . etc. of the picture is:

$$T^1B^1, T^1B^2, T^2B^3, T^3B^3, T^4B^4$$

A similar result can be achieved with the sequence:

$$B^1T^1, B^1T^2, B^2T^3, B^3T^3, B^4T^4$$

To output the sequence $T^1B^1, T^1B^2, T^2B^3, T^3B^3, T^4B^4$, the display sequence control 80 controls the decoding and output as follows:

Start with decoding of the first frame and storing $T^1$ and $B^1$ to output buffer; then
(1) Output $T^1$, suppress decoding of the second frame;
(2) Output $B^1$, allow decoding of the second frame with overwrite of $B^1$ only as memory is freed;
(3) Output $T^1$ again while allowing decoding of the second frame to continue overwriting $T^1$ as memory is freed;
(4) Output $B^2$, allow decoding of the third frame with overwrite of $B^2$ only as memory is freed;
(5) Output $T^2$ while allowing decoding of the third frame to continue overwriting $T^2$ as memory is freed;
(6) Output $B^3$, suppress decoding of the fourth frame;
(7) Output $T^3$, allow decoding of the fourth frame with overwrite of $B^3$ only as memory is freed;
(8) Output $B^3$ again while allowing decoding of the fourth frame to continue overwriting $B^4$ as memory is freed;
(9) Output $T^4$ while allowing decoding of the fifth frame overwriting $T^4$ as memory is freed;
(10) Output $B^4$ while allowing decoding of the fifth frame to continue overwriting $B^4$ as memory is freed.
etc.

EXAMPLE 3

The case where 3:2 pull-down conversion is required with a 3-frame video buffer available in the case of, for example, a motion picture is encoded in progressive frames at 20 frames per second to be presented by a system having an NTSC display format of 30 frames (60 fields) per second. This requires a 2:3 frame rate conversion. In this case, every two frames of a program bitstream in the form of:

$$T^1B^1, T^2B^2$$

must be output as three frames. Such conversion may involve outputting the first field of the first frame twice as the first and third fields and outputting the second field of the second frame twice as the fourth and sixth fields of a six field sequence. The output sequence of the fields of the successive frames 1, 2, . . . etc. of the picture is:

$$T^1B^1, T^1B^2, T^2B^2$$

A similar result can be achieved with the sequence:

$$B^1T^1, B^1T^2, B^2T^2$$

To output the sequence $T^1B^1, T^1B^2, T^2B^2$, the display sequence control 80 controls the decoding and output as follows:

Start with decoding of the first frame and storing $T^1$ and $B^1$ to output buffer; then (1) Output $T^1$, suppress decoding of the second frame;
(2) Output $B^1$, allow decoding of the second frame with overwrite of $B^1$ only as memory is freed;
(3) Output $T^1$ again while allowing decoding of the second frame to continue overwriting $T^1$ as memory is freed;
(4) Output $B^2$, suppress decoding of the third frame;
(7) Output $T^2$, allow decoding of the third frame with overwrite of $B^2$ only as memory is freed;
(8) Output $B^2$ again while allowing decoding of the third frame to continue overwriting $B^2$ as memory is freed.
etc.

EXAMPLE 4

The case where conversion is required with a 3-frame video buffer available includes the situation where, for example, a PAL program frame encoded at 25 frames per second is to be presented by a system having an NTSC display format of 30 frames (60 fields) per second. This requires a 5:6 frame rate conversion. In this case, every five frames of a program bitstream in the form of:

$$T^1B^1, T^2B^2, T^3B^3, T^4B^4, T^5B^5$$

must be output as six frames. Such a conversion may involve outputting the first field of the first frame twice as the first and third fields and outputting the second field of the third frame as the sixth and eighth fields of a twelve field sequence. The output sequence of the fields of the successive frames 1, 2, . . . etc. of the picture is:

$$T^1B^1, T^1B^2, T^2B^3, T^3B^4, T^4B^4, T^5B^5$$

A similar result can be achieved with the sequence:

$$B^1T^1, B^1T^2, B^2T^3, B^3T^4, B^4T^4, B^5T^5$$

To output the sequence $T^1B^1, T^1B^2, T^2B^3, T^3B^4, T^4B^4T^5B^5$, the display sequence control 80 controls the decoding and output as follows:

Start with decoding of the first frame and storing $T^1$ and $B^1$ to output buffer; then
(1) Output $T^1$, suppress decoding of the second frame;
(2) Output $B^1$, allow decoding of the second frame with overwrite of $B^1$ only as memory is freed;
(3) Output $T^1$ again while allowing decoding of the second frame to continue overwriting $T^1$ as memory is freed;
(4) Output $B^2$, allow decoding of the third frame with overwrite of $B^2$ only as memory is freed;
(5) Output $T^2$ while allowing decoding of the third frame to continue overwriting $T^2$ as memory is freed;
(6) Output $B^3$, suppress decoding of the fourth frame;
(7) Output $T^3$, allow decoding of the fourth frame with overwrite of $B^3$ only as memory is freed;
(8) Output $B^4$ while allowing decoding of the fourth frame to continue overwriting $B^4$ as memory is freed;
(9) Output $T^4$ while allowing decoding of the fifth frame overwriting $T^4$ as memory is freed;
(10) Output $B^4$ again while allowing decoding of the fifth frame to continue overwriting $B^4$ as memory is freed;
(11) Output $T^5$ while allowing decoding of the sixth frame overwriting $T^5$ as memory is freed;
(10) Output $B^5$ while allowing decoding of the sixth frame to continue overwriting $B^5$ as memory is freed.
etc.

EXAMPLE 5

The case where 3:2 pull-down conversion is required with a 3-frame video buffer available includes the situation where, for example, a motion picture is encoded in progressive frames at 24 frames per second to be presented by a system having an NTSC display format of 25 frames (50 fields) per second. This requires a 24:25 frame rate conversion. In this case, every twenty-four frames of a program bitstream in the form of:

$$T^1B^1, T^2B^2, T^3B^3, T^4B^4, \ldots, T^{24}B^{24}$$

must be output as twenty-five frames. Such conversion involves outputtng the first field of the first frame twice as the first and third fields and outputting the second field of the frame 3+N as field 6+N and 8+N of a 25 field sequence, where N may be any number less than 22, but is preferably zero. The output sequence of the fields of the successive frames 1, 2, . . . etc. of the picture is:

$$T^1B^1, T^1B^2, T^2B^3, T^3B^4, T^4B^4, \ldots, T^{24}B^{24}$$

Otherwise, the display sequence control 80 controls the decoding and output similar to the method of example 3.

EXAMPLE 6

The case where 3:2 pull-down conversion is required with a 3-frame video buffer available in the case of, for example, a motion picture is encoded in progressive frames at 20 frames per second to be presented by a system having a PAL display format of 25 frames (50 fields) per second. This requires a 4:5 frame rate conversion as described in example 3.

EXAMPLE 7

In cases where conversion is from NTSC to PAL, for example, a 6:5 conversion rate is required, calling for the skipping of one frame, or two fields, for every six frames of input. If the two fields skipped are not from consecutive frames, the reversal of the display order of the fields of intervening frames will be required. This is carried out by signals from the display sequence control 80 to the video decoder 56.

Half+ Frame Output Buffer

In the following set of examples, the DRAM buffer includes an output buffer 78 that is capable of storing one half of a frame, or one full field, plus workspace of one or more rows of blocks, but less than a full frame of the output picture. If the display 34 is configured to display a color image of 480 scan lines, the output buffer will hold at least 248 scan lines. In preferred embodiments the output buffer has a capacity to store 256, 264, 272 or 288 scan lines of the output picture. The configuration of DRAM 42 in which the output buffer 78 holds one field plus a few rows of blocks is referred to as a 2.5×-frame video buffer configuration because it includes two full-frame reference picture buffers 73A and 73B plus an output buffer 78 that holds 0.5 frames plus the additional row(s) of blocks.

Figure 5:
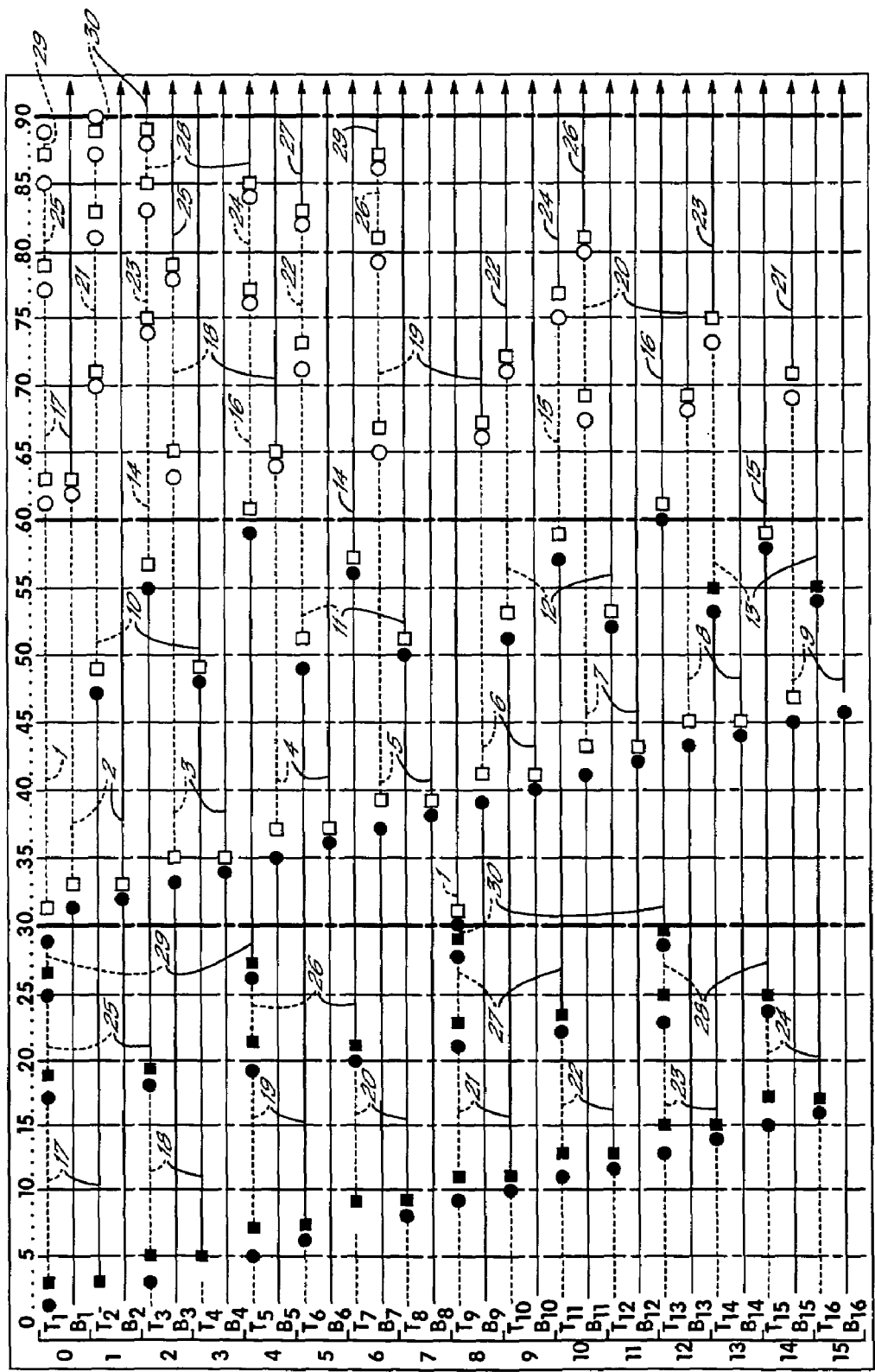
FIG. 5 is a timing diagram illustrating the writing and reading of a 0.533 frame output buffer similar to that of FIG. 4D for normal output.

FIG. 5 represents a memory map and timing diagram showing how the display sequence control 80 regulates the storage and output of the top then the bottom field of a first frame followed by the top field of a second frame (i.e., $T^1B^1, T^2 \ldots$), where the output buffer has capacity to store 0.533 frames, which is one row of 16×16 macroblocks (two rows of 8×8 blocks) more than one field (one-half frame) of output picture. This is referred to as a 2.53 frame video buffer. The 0.533 frame output buffer 78 includes storage for 264 scan lines or 32 8-line blocks or 16 16-line macroblocks. Sixteen macroblock sized rows of memory are identified by the numbers 0, . . . , 15 along the left side of FIG. 5. The initial arrangement of the rows of data has the eight lines of the top field of a frame stored in a memory row adjacent the eight rows of the bottom field of the same frame, similar to the arrangement of FIG. 4C. This arrangement is short lived as the display sequence controller 80 and memory controller 50 write rows of blocks into whatever rows become available first by the readout of data that is no longer needed.

EXAMPLE 8

The case where no frame rate conversion is required and a 2.53-frame video buffer is used is illustrated in FIG. 5 for a program of 30 frames per second being presented by a system having an NTSC display format which displays frames at the same 30 frame per second rate. Time intervals of 1/60th frame, or 1/1800th second, are listed along the top in FIG. 5. The output sequence of the fields of the successive frames of the picture, which are identified by the superscripts 1, 2, . . . etc., is illustrated as:

$$T^1B^1, T^2B^2, T^3B^3, \ldots, \text{etc.}$$

With the 2.53 frame buffer, revolving use of the memory is required and is provided by initially writing the top half of the first frame, or 16 slices of top and bottom fields of the frame, to the memory rows as indicated by the notations $T^1_1, B^1_1, T^1_2 B^1_2, T^1_3 B^1_3, \ldots, T^1_{16} B^1_{16}$ at the left in FIG. 5. The superscript designates the first frame while the subscripts designate the row of macroblocks of the picture. While these data are shown as being present in the memory at time interval 0, it is only necessary that each row of blocks be written to the buffer before that row is to be sent to the display. Time interval 1 shows the top field of the top row of macroblocks $T^1_1$, represented by the circle, being sent to the display. Time interval 2 shows the top field of the second row of macroblocks $T^1_2$ being sent to the display. As a result of the output of the top fields of rows 1 and 2, the rows of memory that they occupied are available for the writing thereto of the 17th row of blocks of the top and bottom fields of the frame, fields $T^1_{17}$ and $B^1_{17}$, of the frame, as indicated by the squares in the figure. These rows are the first and third block rows of the memory, or the top halves of the first and second macroblock rows, rows 0, and 1. As shown, the first frame is fully decoded and written to the buffer 78 by time interval 29, which is necessary since the last row of macroblocks of the top field is sent to the display in time interval 30.

In time interval 31, the output of the first row of the bottom field $B^1_1$ begins. In interval 32, bottom field row $B^1_2$ is output. By time interval 33, as a result of the output of the bottom fields of rows 1 and 2, the rows of memory that they occupied are available for the writing thereto of the first row of blocks of each of the top and bottom fields of the next frame, frame 2, which are fields $T^2_1$ and $B^2_1$, of the frame, as indicated by the squares in the figure. These rows are the second and fourth block rows of the memory, or the bottom halves of the first and second macroblock rows, rows 0, and 1. Regardless of the decoding of the second frame, the last row of macroblocks of the bottom field is sent to the display in time interval 60.

During intervals 61-90, the top field of the second frame is output in the same manner that the top field of the first frame was output during intervals 1-30. It should be noted that at interval 61, the entire bottom field of the first frame, $B^1{}_1$, is still in the output buffer memory. The top field of the first frame, $T^1{}_1$, has, however, been overwritten. Therefore, if it had been necessary to repeat a field of the first frame, the data from the top field of the first frame, $T^1{}_1$, cannot be repeated to the top field portion of the display, but only the data from the bottom field, $B^1{}_1$, unless it were possible to decode the first frame again. This example assumes that the video decoder 56 cannot be operated to decode frames twice in the time available. The way that the display sequence control 80 handles this situation is set forth in the next example.

EXAMPLE 9

Figure 5A:
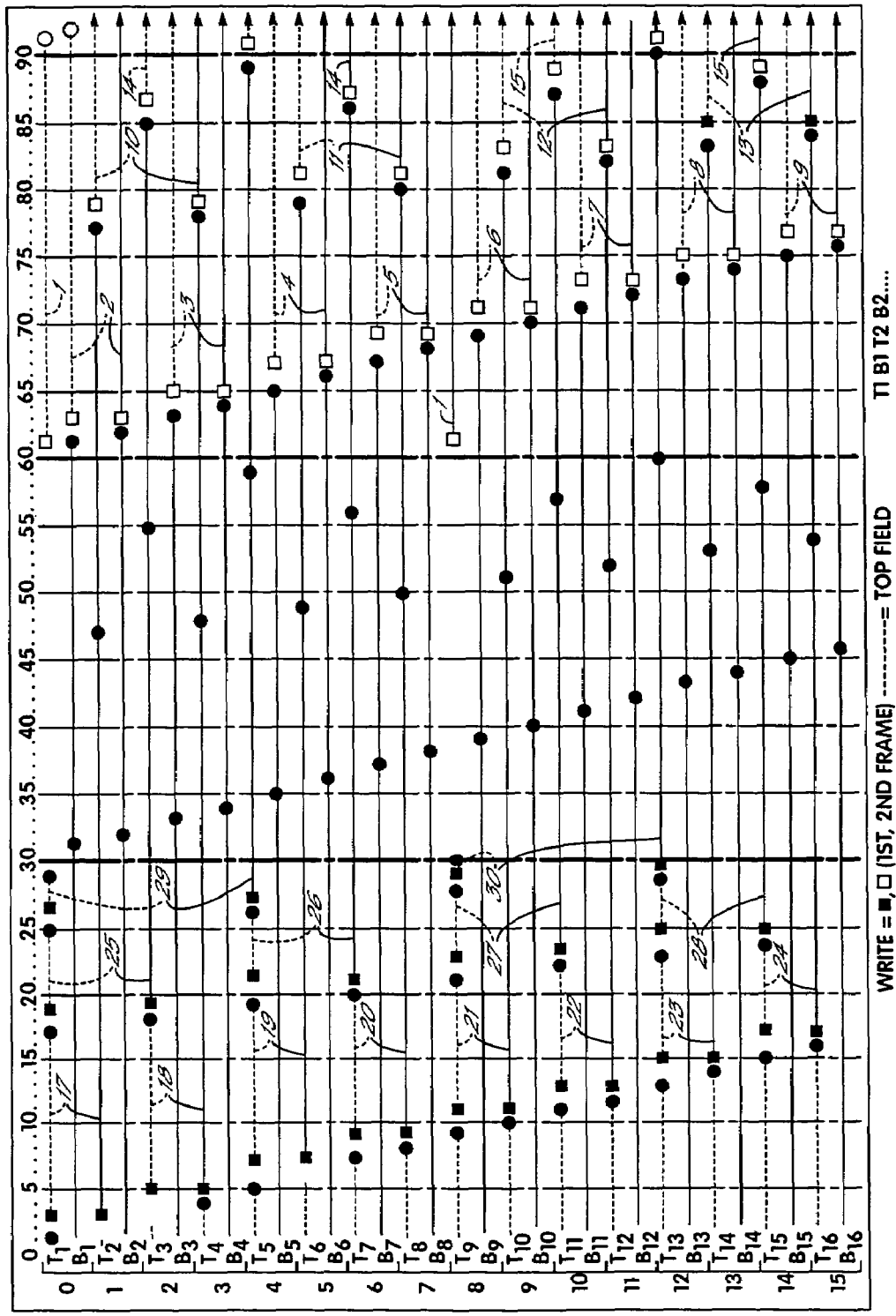
FIG. 5A is a timing diagram similar to FIG. 5 illustrating the writing and reading of a 0.533 frame output buffer with field repetition.

The case where 3-2 pull-down conversion is required with a 2.53-frame video buffer covers the situation where progressive frames at 24 frames per second must be presented by an NTSC display at 30 frames (60 fields) per second, requiring a 4:5 frame rate conversion involving the repeating of one field in every four received. In this case, every four frames of a program bitstream in the form of:

$$T^1B^1, T^2B^2, T^3B^3, T^4B^4$$

must be output as five frames. As stated above, it is not possible to repeat data from the top field of the first frame, $T^1{}_1$, since it is overwritten by the time the bottom field, $B^1{}_1$, is output. The display sequence control 80 handles this by repeating the bottom field of the first frame, $B^1{}_1$, in place of the top field, which accommodates the case where the decoder 56 does not have the time to decode the first frame again. This is illustrated in FIG. 5A. For the 4:5 frame rate conversion with a 2.53-frame video buffer, the output sequence of the fields of the successive frames 1, 2, . . . etc. of the picture is:

$$T^1B^1, B^1B^2, T^2B^3, T^3T^3, T^4B^4$$

A similar result can be achieved, where the bottom field is to be written first, with the sequence:

$$B^1T^1, T^1T^2, B^2B^3, T^3T^3, B^4T^4$$

To output the sequence $T^1B^1, B^1B^2, T^2B^3, T^3T^3, T^4B^4$ with a 2.53-frame video buffer, the display sequence control 80 controls the decoding and output as follows:

Start with decoding of the first frame and storing $T^1$ and $B^1$ to output buffer; then
(1) Output $T^1$, suppress decoding of the second frame;
(2) Output $B^1$, allow decoding of the second frame with overwrite of $B^1$ only as memory is freed;
(3) Output $B^1$ again while allowing decoding of the second frame to continue overwriting $B^1$ as memory is freed;
(4) Output $B^2$, allow decoding of the third frame with overwrite of $B^2$ only as memory is freed;
(5) Output $T^2$ while allowing decoding of the third frame to continue overwriting $T^2$ as memory is freed;
(6) Output $B^3$, suppress decoding of the fourth frame;
(7) Output $T^3$, allow decoding of the fourth frame with overwrite of $B^3$ only as memory is freed;
(8) Output $T^3$ again while allowing decoding of the fourth frame to continue overwriting $T^3$ as memory is freed;
(9) Output $T^4$ while allowing decoding of the fifth frame overwriting $T^4$ as memory is freed;
(10) Output $B^4$ while allowing decoding of the fifth frame to continue overwriting $B^4$ as memory is freed.
etc.

With this output sequence, the use of a buffer memory that is smaller than the 3-frame buffer memory of Example 2 is made possible. While the output is not MPEG compliant and is of lower quality when used for an entertainment system, the system is more economical and produces quality reproduction particularly suitable for many industrial applications and low cost consumer systems.

For the conversions set forth in Examples 3-7 above, similar field substitutions of fields can be made to accommodate the use of a 2.53 frame buffer memory.

As can be seen from FIG. 5, with a 2.53-frame video buffer, the video decoder 56 must be capable of decoding a slice-row of a frame, particularly macroblock row 30 of the first frame, for example, in the time available after the display of row 28 of the top field in interval 28, and before the output of row 30 of the top field in interval 30. Otherwise, row 30 would have to be skipped. This time can be increased by providing additional block rows to the buffer 78. Adding one block row provides a 0.55 frame output buffer, or a 2.55 frame video buffer, which lengthens the shortest time interval in which the decoder must operate. Adding three more block rows produces a 0.6 frame output buffer or a 2.6 frame video buffer, which further increases the time available for the decoder. Providing the additional time for the decoder ultimately makes possible the decoding of the same picture twice. Decoding a frame twice can allow the use of a small memory having an output buffer of less than one full frame in size without the need to replace one top or bottom field display with a display of the other, as in replacing TBT or BTB with TBB or TTT.

EXAMPLE 10

In the case of 3:2 pull-down conversion, decoding of frames more than once can be carried out in certain embodiments of the invention, such as, for example, with a 2.6-frame video buffer, thereby allowing for MPEG compliant converting of, for example, a motion picture encoded in progressive frames at 24 frames per second to be presented by a system having an NTSC display format of 30 frames (60 fields) per second, or a 4:5 frame rate conversion. This example illustrates that, with a video decoder 56 that will decode one frame faster than the 1/30th second display interval, or at 1.5× faster than they are output. This example illustrates that where there is time to decode at least every other frame twice, it is possible to repeat the first frame of alternate pictures so that every four frames of a program bitstream in the form of:

$$T^1B^1, T^2B^2, T^3B^3, T^4B^4$$

can be output as five frames in the manner that MPEG specifies, by outputting the first field of the first frame twice as the first and third fields and the outputting of the second field of the third frame as the sixth and eighth fields of a ten field sequence, as:

$$T^1B^1, T^1B^2, T^2B^3, T^3B^3, T^4B^4$$

To output the sequence $T^1B^1, T^1B^2, T^2B^3, T^3B^3, T^4B^4$ in this case, the display sequence control 80 controls the decoding and output as follows: Start with decoding of the first frame and storing $T^1$ and $B^1$ to output buffer, but cause the DMUX 53 to suspend overwriting the first frame when it is read from the video FIFO buffer 67; then:

(1) Output $T^1$, suppress decoding of the second frame;
(2) Output $B^1$, decode the first frame again with overwrite of $B^1$ as memory is freed, only storing the top field $T^1$ (because memory is not needed to store $B^1$ again, the decoder can run at 1.5 block rows per interval, decoding ⅔ of the frame to be decoded while $B^1$ is being displayed);
(3) Output $T^1$ again while decoding the remainder of $T^1$ and also decoding ⅓ of the second frame overwriting $T^1$ as memory is freed;
(4) Output $B^2$, decoding the remainder of the second frame, with overwrite of $B^2$ as memory is freed;
(5) Output $T^2$ while allowing decoding of ⅔ of the third frame, overwriting $T^2$ as memory is freed;
(6) Output $B^3$ while decoding remainder of third frame and suppressing of decoding of the fourth frame;
(7) Output $T^3$, decode the third frame again with overwrite of $T^3$ as memory is freed, only storing the bottom field $B^3$ decoding ⅔ of the frame to be decoded while $T^3$ is being displayed;
(8) Output $B^3$ again while allowing decoding of the fourth frame to continue overwriting $B^3$ as memory is freed;
(9) Output $T^4$ while allowing decoding of the fifth frame overwriting $T^4$ as memory is freed;
(10) Output $B^4$ while allowing decoding of the fifth frame to continue overwriting $B^4$ as memory is freed.
etc.

Figure 6:
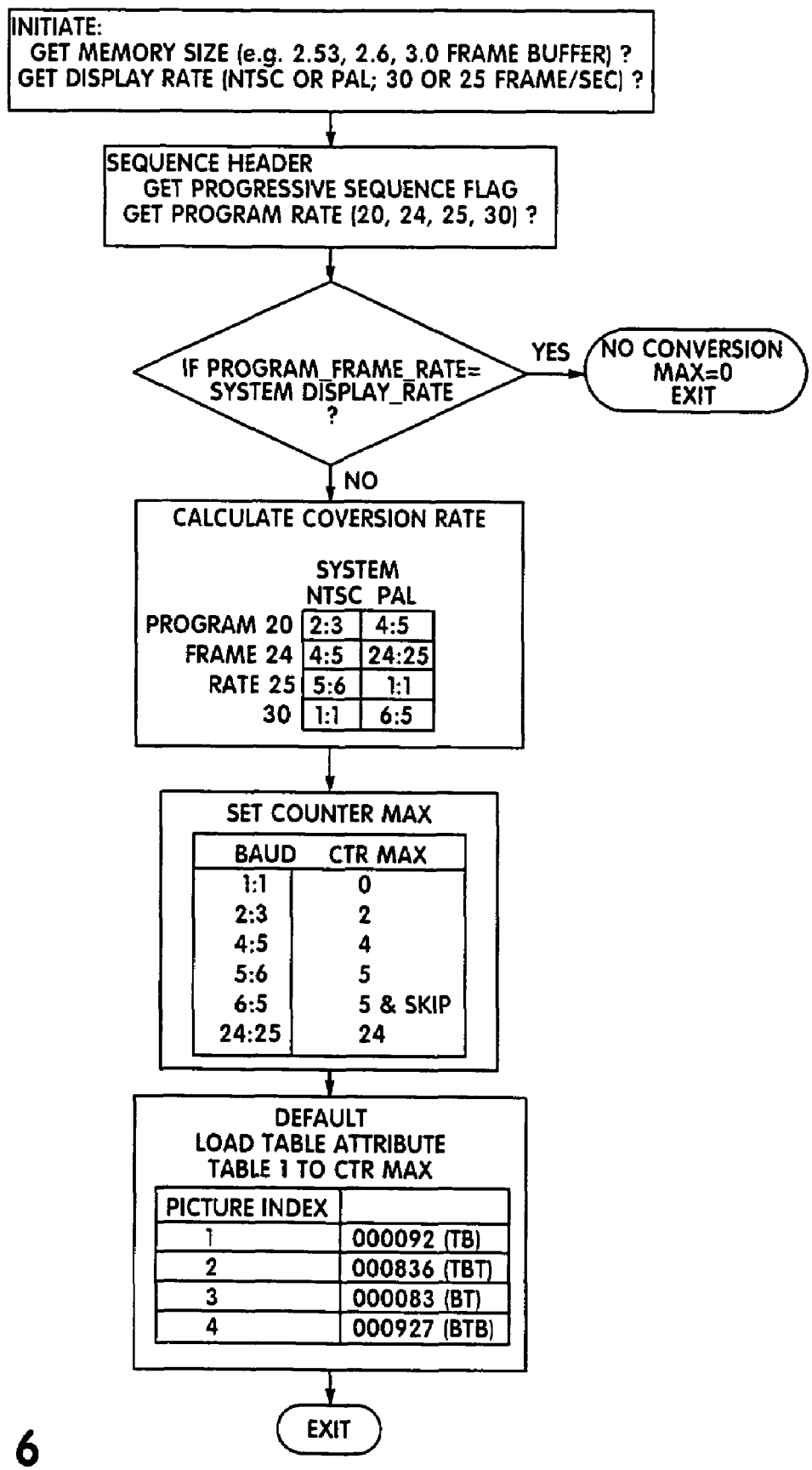
FIGS. 6, 6A and 6B are flowcharts illustrating the operation of the RISC of the receiver of FIGS. 1-3 in decoding pictures in a way that particularly facilitates frame rate conversions.

A flow chart outlining the operation of the field sequence control logic 80 and the picture repeat attribute routine 96 is illustrated in FIG. 6. Upon initiation, the RISC 61 sets certain variables based on the configuration of the host system, including those affecting frame rate conversions, particularly, DRAM memory size (e.g., output buffer 78 size=full frame, 0.53 frame, 0.6 frame, etc.) and the system presentation device display rate (30 frames/second for NTSC or 25 frames/second for PAL). When each Sequence Header is received, the RISC 61 reads from it certain other parameters affecting frame rate conversion decisions, including the Progressive Sequence bit and the Frame Rate of the encoded original program. The Progressive Sequence bit, found in an MPEG-2 sequence extension, specifies whether all pictures are progressive frames that are to be repeated as frames when the picture header so indicates. The original program frame rate may be 25 or 30 frame/second standard PAL or NTSC sequences or may be 20 or 24 frame/second film sequences that will require 3:2 pull-down conversion. From these variables, a preliminary determination is made in the RISC 61 of whether frame rate conversion is necessary and, if so, a table is constructed for use determining which fields are to be repeated or which fields are to be skipped.

If the display rate of the system differs from that of the sequence of pictures being received, the frame rate conversion ratio is determined and a Counter_Maximum setting is made, which corresponds to the number of pictures that must be decoded to produce a corresponding number of output fields. For example, to play a 24 frame per second progressive frame encoded motion picture program on a 30 frame (60 field) per second NTSC interlaced television display, a 4:5 frame rate conversion ratio is required. To accomplish this, five frames (ten fields) must be output for every four full frame pictures received. The Counter_Maximum or Ctr_MAX is set to 4. Then, a picture attribute table is set up which specifies how each picture of a 4 picture recurring sequence of pictures is to be displayed. In this example, the display of four consecutive pictures of the picture sequence may include display of respective top and bottom fields of each picture as: TBT, BT, BTB, and TB. So displayed, the top field, bottom field and top field again of the first picture are displayed, the top field thereby being displayed twice, then the bottom field of the second picture is displayed followed by display of its top field, then the bottom field of the third picture is displayed followed by the top field of the picture and then the bottom field again, the bottom field thereby being displayed twice, and then the fourth picture is displayed top field first then bottom field. This produces the desired ten fields of output from the four pictures of the sequence for a 4:5 frame rate conversion. As a result, by decoding six such 4-picture sequences, 30 frames of output in one second from 24 frames of original picture input in one second.

If, based on the variables known at the sequence level, the frame rate of the program sequence is the same as that of the system, which is the case where a 25 frame/second program is being received by a 25 frame/second PAL system and where a 30 frame/second program is being received by a 30 frame/second NTSC system, then no frame rate conversion is necessary. The Ctr_MAX is set to 0 to designate this condition. Where the rates do not so match, the conversion rate ratio is determined as follows:

(1) Where a PAL program (25 frames/sec.) is being received on an NTSC system (30 frames/sec.), six frames must be displayed for every five received, so the ratio is 5:6 and Ctr_MAX is set at 5.
(2) Where an NTSC program (30 frames/sec.) is being received on a PAL system (25 frames/sec.), five frames must be displayed for every six received, so the ratio is 6:5. Ctr_MAX is initially set at 6, but one received frame is skipped for every five that are decoded.
(3) Where a 24 frame/second program is received (typically a progressive frame film program), the program must be converted either to 25 frames/second for a PAL display or 30 frames/second for an NTSC display, respectively calling for 24:25 and 4:5 conversion ratios, typically using 3:2 pull-down techniques.
(4) Where a 20 frame/second program is received (also typically a progressive frame film program), the program must be converted either to 25 frames/second for a PAL display or 30 frames/second for an NTSC display, respectively calling for 4:5 and 2:3 conversion ratios, also using 3:2 pull-down techniques.

When the conversion ratio is determined and the Ctr_MAX variable is set for that ratio, a default picture attribute table 98 (FIG. 3) is defined. This table is loaded with one picture attribute string for each picture. The string contains bits that tell the field display control 82 how to display one or more fields from a given picture. For each of several possible field display sequences listed in Table 1 below, a hexadecimal code is stored in the attribute table. These sequences include those discussed in the examples above. The Code in the table represents strings of words of 4-bits each, each word representing one field display. The sequence in which the words are used for display is from right to left in the table. The four bits of each word include a rightmost "b" or "B" bit, which is 1 to indicate a bottom (B) field is to be displayed. The next bit is the "w" or "W" bit, which is 1 to indicate that, while the field is being read from a buffer and displayed, that decoding of another frame is suspended and is to wait. The third bit is the "d" or "D" bit, which is 1 when the overwriting of the data in the buffer from which the field is being read is disabled so the field data is saved to be displayed again, and is 0 when the data is no longer needed after being displayed and can be overwritten. The 4th bit is the "end" bit, which is only "1" in the leftmost word of the string.

TABLE I
DEFAULT PICTURE ATTRIBUTE TABLE

| Sequence | Code | edwb | edwb | edwb | edwb | edwb | edwb | (bits) |
|---|---|---|---|---|---|---|---|---|
| B | 0x000009 | 1001 | | | | | | |
| T | 0x000008 | 1000 | | | | | | |
| BT | 0x000083 | 1000 | 00*1*1 | | | | | |
| TB | 0x000092 | 1001 | 001*0* | | | | | |
| TT | 0x000082 | 1000 | 0010 | | | | | |
| BB | 0x000092 | 1001 | 0011 | | | | | |
| BTT | 0x000863 | 1000 | 0110 | 00*1*1 | | | | |
| BTB | 0x000927 | 1001 | 01*1*0 | 00*1*1 | | | | |
| TBB | 0x000972 | 1001 | 0111 | 001*0* | | | | |
| TBT | 0x000836 | 1000 | 00*1*1 | 01*0* | | | | |
| TBBB | 0x009772 | 1001 | 0111 | 0111 | 001*0* | | | |
| TBTB | 0x009276 | 1001 | 0010 | 01*1*1 | 01*1*0 | | | |
| BTTT | 0x008663 | 1000 | 0110 | 0110 | 00*1*1 | | | |
| BTBT | 0x008367 | 1000 | 0011 | 01*1*0 | 01*1*1 | | | |
| TBBBBB | 0x977772 | 1001 | 0111 | 0111 | 0111 | 0111 | 001*0* | |
| TBTBTB | 0x927676 | 1001 | 0010 | 01*1*1 | 0110 | 01*1*1 | 01*1*0 | |
| BTTTTT | 0x866663 | 1000 | 0110 | 0110 | 0110 | 0110 | 00*1*1 | |
| BTBTBT | 0x836767 | 1000 | 0011 | 01*1*0 | 0111 | 01*1*0 | 01*1*1 | |

The d bits in italics are 0s in the case of field pictures, since a second field decode is needed, so a hexadecimal 2 is subtracted from the Code. The underlined italic d bits are 0s where a frame picture is to be decoded another time due to memory limitations, so a hexadecimal 20 or 2020 is subtracted from the Code. In the table above, some of the attribute strings are used for the frame rate conversions described above, while others, particularly the longer strings, are used for transitions to and from various trickplay modes such as pause and slow forward.

The picture decode control 81 decodes pictures and keeps track of their locations in the buffer memory pending their display. The field display control 82 displays one field at a time in accordance with four attribute bits and a row map table identification it receives from the picture decode control 81. On decoding a picture, the decode control 81 constructs and saves an entire one of the attribute strings from Table 1 which defines every field output that is to occur from the picture. Whenever a field clock signal is received indicating that the next field is to be displayed, the decode picture control 81 determines which field is to be displayed and where it is stored in memory. It then extracts one four bit word from the attribute string from the picture and transmits it along with one row table identifier.

The value of Ctr_MAX determines the number of consecutive pictures in a series that must be decoded and displayed according to a table of attributes to produce the desired frame rate conversion. As pictures are received, they are logged in presentation order and counted by incrementing a counter from 1 to Ctr_MAX and then repeating the cycle as pictures continue to be received and as long as the frame rate conversion parameters still apply. Pictures are not necessarily received in their presentation orders, so they must be logically rearranged before they are displayed. For example, a typical group of pictures might include pictures intended for display in order 1, . . . , 12 following the display of a previously decoded reference picture already in a buffer 73. The picture types of the twelve pictures of the GOP may be, for example, in display order 1 to 12: B, B, I, B, B, P, B, B, P, B, B, P. Reference pictures often must be used for copying of data to B-pictures before the reference pictures are due for display. As a result, the received order of the pictures may be 3, 1, 2, 6, 4, 5, 9, 7, 8, 12, 10, 11. It is necessary to arrange the picture display attributes in display order, not the picture received order, and to correlate the received pictures to the corresponding attributes based on the Temporal_Picture_Number in the picture header, which indicates the relative display order of the picture.

Figure 6A:
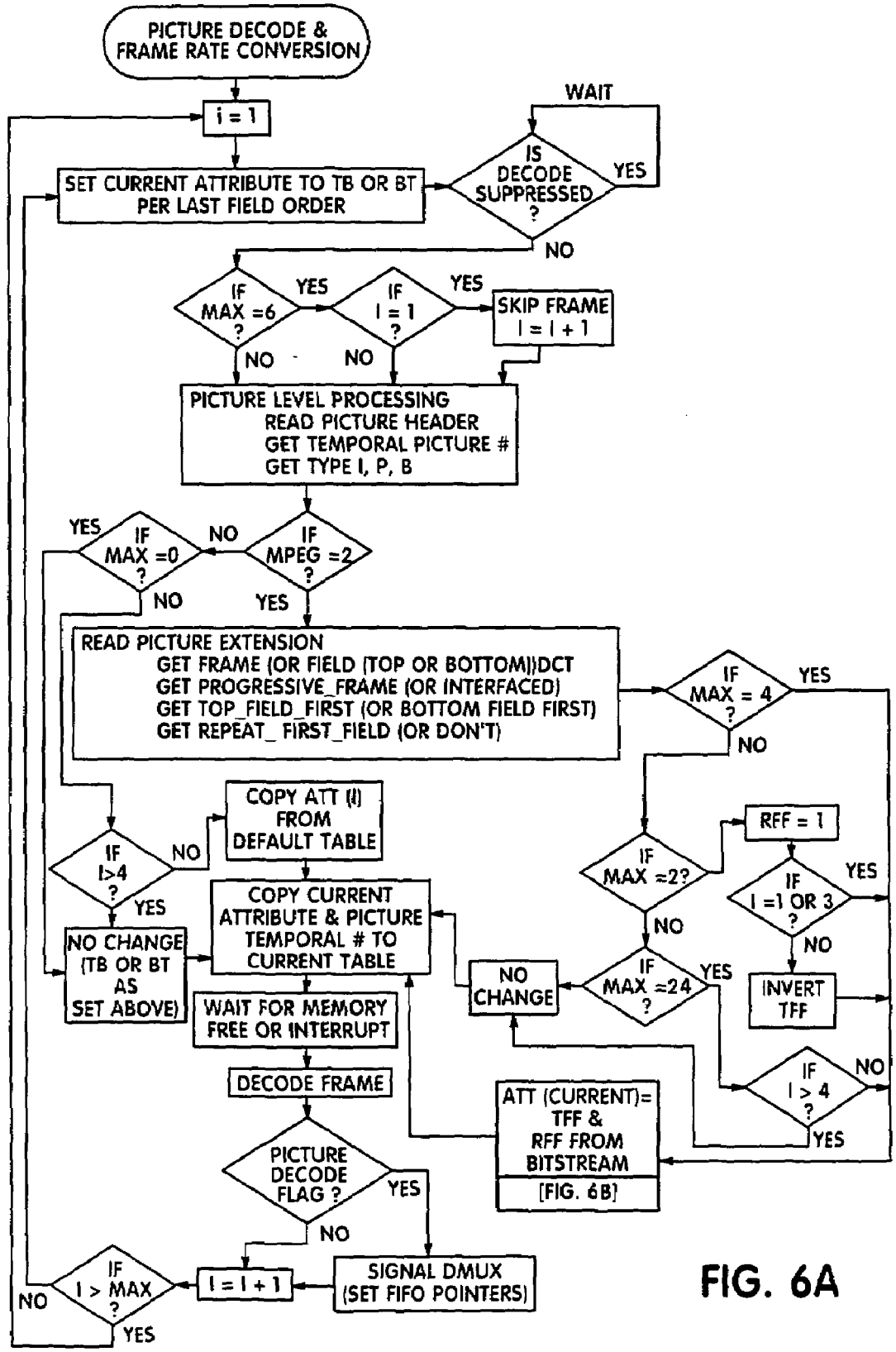

Picture headers and picture extensions contain data that can call for the altering of the display attributes originally loaded into the default attribute table 98. Therefore, as pictures are received, the attributes are copied from the default attribute table 98 into a current attribute table 99 and modified if necessary in the process, if called for by information in the picture data that is received. FIG. 6A illustrates a counter loop by which pictures are cycled through the series determined by the Ctr_MAX and attribute settings to produce frame rate conversions, if required. When the loop is first entered, the counter is set to 1 and the Current Attribute for the first picture to be received is set to a preliminary value indicating Normal display of one field then the other, either TB or BT, based on information of the order in which pictures have been displayed, or to TB if no prior order is known. If at this time a Decode_Suppress flag is set, this routine waits until the flag is cleared.

For 6:5 frame rate conversion (from NTSC to PAL), it is only necessary to skip one frame and then to display five frames in normal order. Further, all of the standard conversion ratios repeat fields only in the first four frames of the recurring series, therefore, when I>4, the normal field display sequence for the picture can be carried out, so the normal TB (or BT) attribute is written to the current attribute table 99. Otherwise, the default table 98 attribute for the picture is copied to the current attribute table 99 for the picture. In any event, the RISC 61 then reads the picture header and picture extension, if any, to extract parameter data for use in knowing how to decode and where to store the picture, and also how to display the picture. Variables such as TFF (top_field_first), P/F (progressive_frame), Frame (frame vs. field DCT) and RFF (repeat_first_field) can, in MPEG-2 pictures, fully determine frame rate conversion from, for example 20 or 24 frame/second progressive frame film programs to PAL or NTSC display, by, for example, a 3:2 pull-down technique. The picture header data is interpreted as set forth in FIG. 6B. Where the resulting display order differs from that specified by the default attribute in the default attribute table 99, they supercede the default attribute table attribute. In such a case, the default attributes will be modified when written to the current attribute table 99 for the picture. However, it is possible for the system display rate to still be different than that anticipated by the original picture parameters, so that, even with the program data specifying 3:2 pull-down display order, NTSC to PAL or PAL to NTSC conversion must still be made. This is handled in the process of FIG. 6A by adjusting the TFF and RFF variables before calling the routine of FIG. 6B in the case of 2:3 and 24:25 frame rate conversion ratios.

Figure 6B:
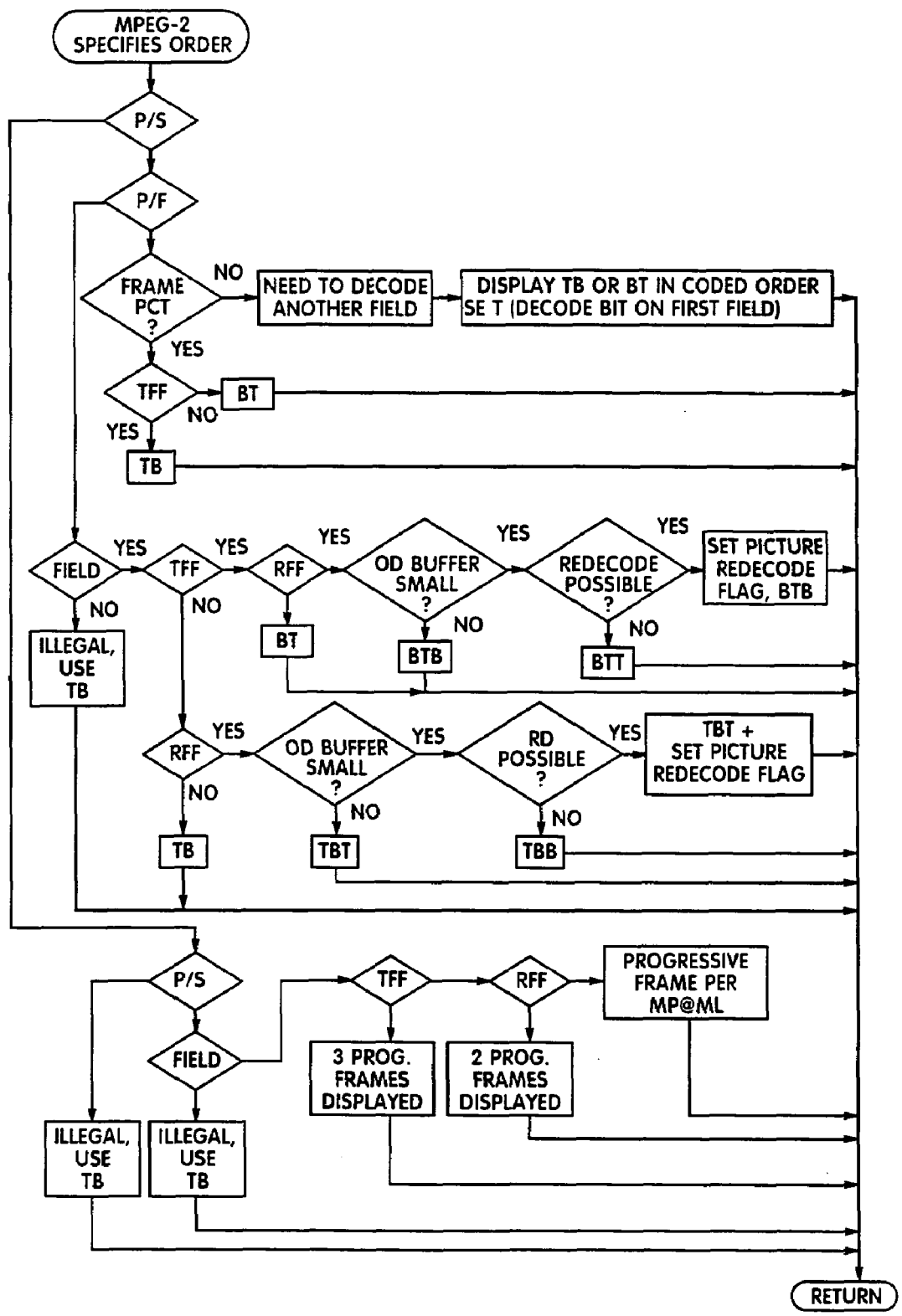
Figures 7, 7A:
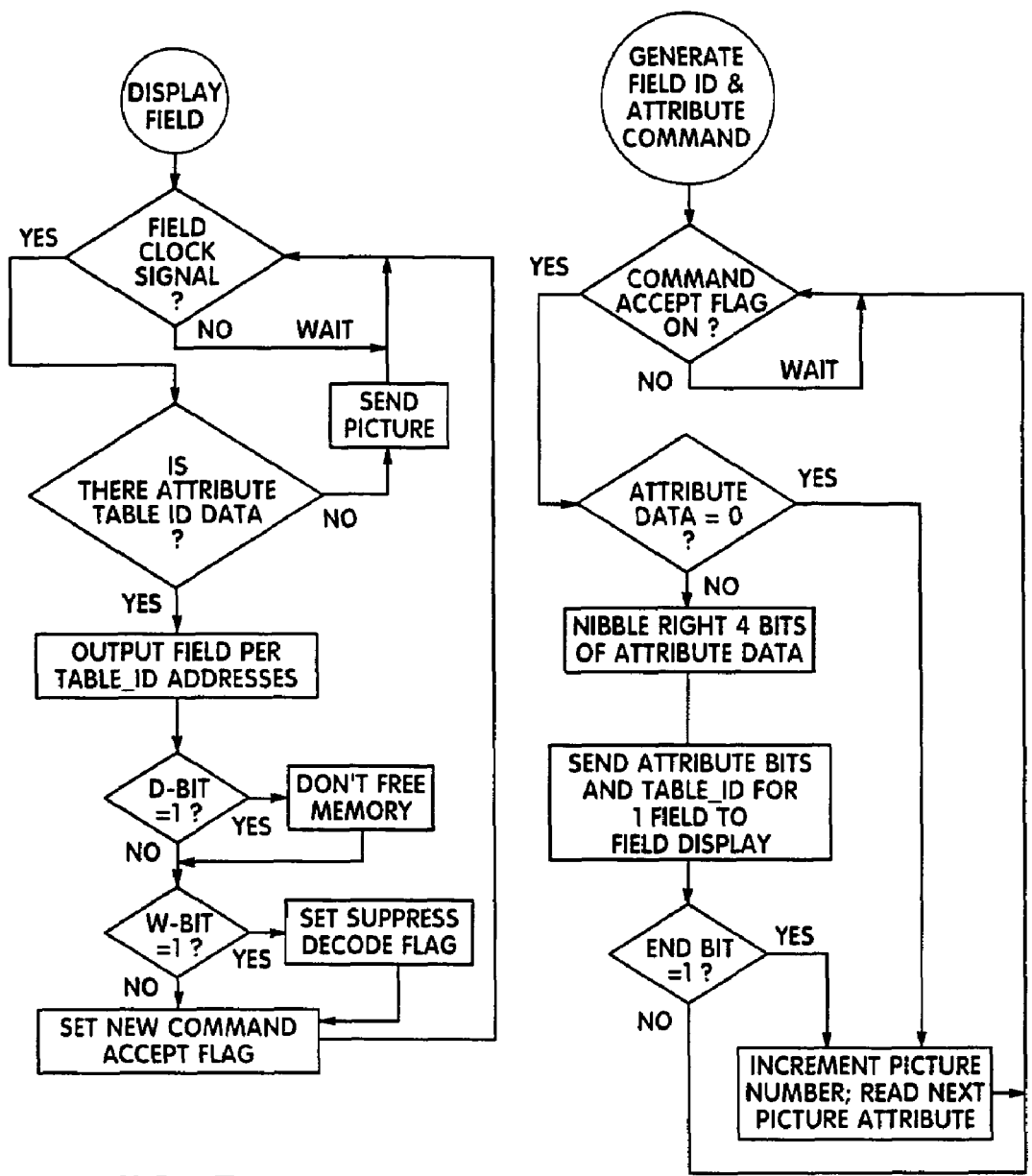
FIGS. 7 and 7A are flowcharts illustrating the operation of the RISC of the receiver of FIGS. 1-3 in displaying fields in a way that particularly facilitates frame rate conversions.

FIG. 6B illustrates the processing of MPEG-2 picture header and extension data that specify field display order, including 3:2 pull-down schemes, contemplated by the original program encoder. The determination of field display order based on picture header and extension data, as well as sequence header and extension data such as P/S (progressive sequence), can result in display orders of TB, TBT, BT and BTB. Where the system has a small memory, such as a 0.533 frame output buffer, B-picture display may also include the sequences of TBB and BTT instead of TBT and BTB, respectively. In certain embodiments having the optional ability to decode the same picture a second time where output buffer memory is less than one full frame, a Re_Decode flag is set and the w-bit of the appropriate attribute, indicated as "*1*" (an underlined italic 1) in Table 1, is set to "0". This causes the decode picture control 81 to signal the DMUX 53 when the picture is decoded to position the read and write pointers of the video FIFO buffer 67 in the FIFO 63 of the DRAM 42 to cause decoding of same frame picture the next time a picture is to be decoded. When current display attributes for a picture have been so determined, as soon as buffer memory for storing the decoded picture becomes available, the picture is decoded and stored in a buffer 73 or 78.

In Table 1, attributes are provided for the repetition of fields in various ways for use in certain trick play modes, such as for transitioning into and out of a pause condition or into and out of a slow forward condition.

Those skilled in the art will appreciate that the applications of the present invention herein are varied, and that the invention is described in preferred embodiments. Accordingly, additions and modifications can be made without departing from the principles of the invention.

What is claimed is:

1. A method of decoding and displaying a sequence of digital video pictures comprising the steps of:
    responding to information in an input video bitstream to determine frame rate conversion needed to display pictures of the sequence;
    determining the amount buffer memory available for use in displaying the sequence; and
    in response to the determined frame rate conversion and the determined available memory, defining different field display sequences to accommodate different memory availability determinations and frame rate conversions.

2. The method of claim 1 wherein:
    the field display sequence defining step includes redisplaying the first field of selected frames again after display of the second field where the amount of buffer memory is one full frame in size and redisplaying the second field of selected frames again after display of the second field where the amount of buffer memory is less than one full frame in size.

3. The method of claim 1 further comprising the steps of:
    establishing a recurring sequence count based on the determined frame rate conversion and decoding recurring sequences of pictures to produce recurring series of decoded field pictures, displaying selected field pictures of the series more than once to implement the determined frame rate conversion.

4. The method of claim 1 further comprising the step of:
    conditioning the decoding step on the availability of buffer memory on a block row basis.

5. A digital video decoder programmed to perform the method of claim 1.

6. A method of decoding an MPEG video signal comprising the steps of:
    providing display logic configured to output a next field of digital video from designated locations in a buffer memory;
    decoding logic picture data from a coded sequence of pictures and storing fields of digital video of the decoded picture to available locations in the buffer memory;
    converting the frame rate of decoded pictures for display by determining (a) whether 3:2 pull-down is indicated, (b) whether NTSC/PAL conversion is indicated and (c) whether the buffer memory is sufficiently large to store one full frame of decoded output; and
    displaying the frame pictures as a sequence of fields at a frame rate converted in accordance with the determinations.

7. The method of claim 6 wherein:
    the determination of whether 3:2 pull-down is indicated is responsive to information accompanying the picture data where the data is of a DYD program.

8. The method of claim 6 wherein:
    the determination of whether 3:2 pull-down is indicated is responsive to a comparison of the format of the input with the configuration of the display.

9. The method of claim 6 further comprising the steps of:
    associating field sequence display attribute variables with each of the decoded picture fields to coordinate the freeing of buffer memory as fields are displayed for use storage upon decoding of a subsequent frame picture and the timing of the decoder to accommodate field repetition.

10. A digital video decoder programmed to perform the method of claim 6.

11. An MPEG digital video presentation apparatus comprising:
    a display logic section responsive to a "next field" command to output a field of digital video from designated locations in an output buffer memory;
    a frame decoding section operative to decode picture data in response to a "next picture" command and to store fields of digital video of the decoded picture data into available locations in the output buffer memory; and
    a frame rate determination module logically connected between the display logic section and the frame decoding section programmed to determine and manage frame rate conversion sequencing to differently implement the determined frame rate conversion requirements depending on the size of the buffer memory.

12. The method of claim 1 further comprising the steps of:
    storing data of fields to be displayed in an output buffer less than the size need to store a full frame; and
    displaying the fields of each frame in a sequence without decoding or storing in the buffer any frame or field more than once.

13. The method of claim 6 further comprising the steps of:
    storing data of fields to be displayed in an output buffer less than the size need to store a full frame; and
    displaying the fields of each frame in a sequence without decoding or storing in the buffer any frame or field more than once.

14. The apparatus of claim 11 wherein the output buffer memory is less than one full frame in size.

15. The apparatus of claim 11 wherein the output buffer memory is not more than 0.55 of one full frame in size.

16. The apparatus of claim 11 wherein programmed to decode no frames more than once during frame rate conversion.

17. A digital video decoder comprising:
    a display logic section responsive to a "next field" command to output a field of digital video from designated locations in an output buffer memory less than one frame in size;
    a frame decoding section operative to decode picture data in response to a "next picture" command and to store fields of digital video of the decoded picture data into available locations in the output buffer memory, the decoding and storing of each field occurring not more than once per display of a frame;

a frame rate determination module logically connected between the display logic section and the frame decoding section programmed to determine and manage frame rate conversion sequencing.

18. The apparatus of claim 17 wherein the output buffer memory is not more than 0.55 of one full frame in size.

* * * * *